United States Patent
Yoo et al.

(10) Patent No.: US 11,196,344 B2
(45) Date of Patent: Dec. 7, 2021

(54) POWER SWITCHING CIRCUIT, A DC-DC CONVERTER INCLUDING THE SAME AND A VOLTAGE CONVERSION METHOD

(71) Applicants: SAMSUNG ELECTRONICS CO., LTD., Suwon-si (KR); Korea University Research and Business Foundation, Seoul (KR)

(72) Inventors: Sungmin Yoo, Seoul (KR); Hyungmin Lee, Seoul (KR); Taehwang Kong, Suwon-si (KR); Sangho Kim, Suwon-si (KR); Seun Shin, Cheonan-si (KR); Junhyeok Yang, Seongnam-si (KR); Woojoong Jung, Seoul (KR)

(73) Assignees: SAMSUNG ELECTRONICS CO., LTD., Suwon-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 3 days.

(21) Appl. No.: 16/788,783

(22) Filed: Feb. 12, 2020

(65) Prior Publication Data
US 2020/0395852 A1     Dec. 17, 2020

(30) Foreign Application Priority Data
Jun. 11, 2019   (KR) .................. 10-2019-0068840

(51) Int. Cl.
*H02M 3/158* (2006.01)
*H02M 1/14* (2006.01)

(52) U.S. Cl.
CPC .......... *H02M 3/1584* (2013.01); *H02M 1/14* (2013.01)

(58) Field of Classification Search
None
See application file for complete search history.

(56) References Cited

U.S. PATENT DOCUMENTS

| | | | |
|---|---|---|---|
| 9,450,491 B2 | 9/2016 | Zhang et al. |
| 9,600,062 B2 | 3/2017 | Kumar |
| 9,793,804 B2 | 10/2017 | Zhang et al. |
| 9,843,259 B2 | 12/2017 | Zhang et al. |

(Continued)

FOREIGN PATENT DOCUMENTS

| EP | 2493060 | 8/2012 |
|---|---|---|
| FR | 3040113 | 8/2010 |

OTHER PUBLICATIONS

European Search Report dated Sep. 8, 2020 from the European Patent Office issued in corresponding European Patent Application No. 20157701.2.

*Primary Examiner* — Jeffrey A Gblende
(74) *Attorney, Agent, or Firm* — F. Chau & Associates, LLC

(57) ABSTRACT

A direct current (DC)-DC converter including: a power switching circuit including a first switch circuit and a second switch circuit that are connected in parallel to a switching node, the first switch circuit and the second switch circuit configured to generate a switching voltage signal through the switching node in response to an input DC voltage and configured to perform complementary switching operations to control a voltage level of the switching voltage signal; and a filter circuit configured to filter the switching voltage signal to generate an output DC voltage.

19 Claims, 29 Drawing Sheets

(56) References Cited

U.S. PATENT DOCUMENTS

| | | |
|---|---|---|
| 2009/0072800 A1 | 3/2009 | Ramadass et al. |
| 2014/0119070 A1 | 5/2014 | Jeong et al. |
| 2016/0172976 A1 | 6/2016 | Mu et al. |
| 2016/0254689 A1 | 9/2016 | Lee et al. |
| 2016/0352219 A1 | 12/2016 | Abdulslam et al. |
| 2017/0201177 A1* | 7/2017 | Kesarwani ............ H02M 3/158 |
| 2017/0324326 A1 | 11/2017 | Liu et al. |
| 2018/0115157 A1 | 4/2018 | Chan et al. |
| 2019/0238059 A1* | 8/2019 | Dai .................... H02M 3/33561 |
| 2020/0021118 A1* | 1/2020 | Wang ................... H02J 7/0024 |

\* cited by examiner

POWER SWITCHING CIRCUIT, A DC-DC CONVERTER INCLUDING THE SAME AND A VOLTAGE CONVERSION METHOD

CROSS-REFERENCE TO RELATED APPLICATION

This U.S. non-provisional application claims priority under 35 U.S.C. § 119 to Korean Patent Application No. 10-2019-0068840, filed on Jun. 11, 2019, in the Korean Intellectual Property Office (KIPO), the disclosure of which is incorporated by reference herein in its entirety.

1. TECHNICAL FIELD

Exemplary embodiments of the present inventive concept relate to semiconductor integrated circuits, and more particularly to a power switching circuit, a direct current (DC)-DC converter including the power switching circuit and a voltage conversion method.

2. DISCUSSION OF THE RELATED ART

A voltage converter, which converts a relatively high direct current (DC) voltage to a relatively low DC voltage, is typically employed to provide power to electronic devices. The voltage converter may be included in various devices and systems such as mobile devices, electric motor vehicles, etc. The voltage converter is typically required to have high performance and high efficiency. For example, to rapidly charge various batteries, the voltage converter should convert a high DC voltage to a low DC voltage with high efficiency.

SUMMARY

According to exemplary embodiments of the present inventive concept, a direct current (DC)-DC converter includes a power switching circuit and a filter circuit. The power switching circuit includes a first switch circuit and a second switch circuit that are connected in parallel to a switching node. The first switch circuit and the second switch circuit generate a switching voltage signal through the switching node in response to an input DC voltage and perform complementary switching operations to control a voltage level of the switching voltage signal. The filter circuit filters the switching voltage signal to generate an output DC voltage.

According to exemplary embodiments of the present inventive concept, a power switching circuit includes a first switch circuit and a second switch circuit that are connected in parallel to a switching node. The first switch circuit and the second switch circuit generate a switching voltage signal through the switching node in response to a DC voltage. The first switch circuit includes a first switch connected between a DC voltage node through which the DC voltage is provided and a first node and configured to be turned on in response to a first switch signal, a second switch connected between the first node and the switching node and configured to be turned on in response to a second switch signal, a third switch connected between the switching node and a second node and configured to be turned on in response to a third switch signal, a fourth switch connected between the second node and a ground voltage node through which a ground voltage is provided and configured to be turned on in response to a fourth switch signal, and a first flying capacitor connected between the first node and the second node. The second switch circuit include a fifth switch connected between the DC voltage node and a third node and configured to be turned on in response to a fifth switch signal, a sixth switch connected between the third node and the switching node and configured to be turned on in response to a sixth switch signal, a seventh switch connected between the switching node and a fourth node and configured to be turned on in response to a seventh switch signal, an eighth switch connected between the fourth node and the ground voltage node and configured to be turned on in response to an eighth switch signal, and a second flying capacitor connected between the third node and the fourth node.

According to exemplary embodiments of the present inventive concept, a voltage conversion method includes providing a first switch circuit and a second switch circuit that are connected in parallel to a switching node, wherein the first switch circuit and the second switch circuit are configured to generate a switching voltage signal through the switching node based on an input DC voltage, controlling the first switch circuit and the second switch circuit such that, when the first switch circuit applies a first intermediate voltage to the switching node, the second switch circuit applies a second intermediate voltage to the switching node, and controlling the first switch circuit and the second switch circuit such that, when the first switch circuit applies the second intermediate voltage to the switching node, the second switch circuit applies the first intermediate voltage to the switching node.

According to exemplary embodiments of the present inventive concept, a DC-DC converter includes: a power switching circuit including a first switch circuit and a second switch circuit that are connected in parallel to a switching node, the first switch circuit and the second switch circuit configured to receive an input DC voltage, the first switch circuit configured to generate a first voltage signal, the second switch circuit configured to generate a second voltage signal, the first and second voltage signals being output as a switching voltage signal through the switching node; and a filter circuit configured to filter the switching voltage signal to generate an output DC voltage.

BRIEF DESCRIPTION OF THE DRAWINGS

The above and other features of the present inventive concept will be more clearly understood by describing in detail exemplary embodiments thereof with reference to the accompanying drawings.

DETAILED DESCRIPTION OF THE EMBODIMENTS

Figure 1:
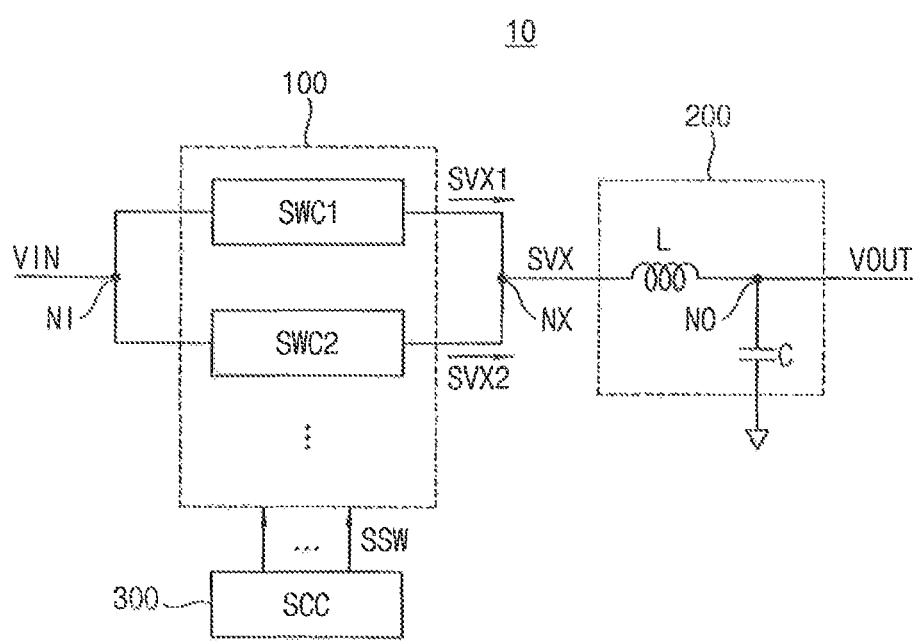
FIG. 1 is a diagram illustrating a direct current (DC)-DC converter according to exemplary embodiments of the present inventive concept.

Exemplary embodiments of the present inventive concept will be described more fully hereinafter with reference to the accompanying drawings. In the drawings, like numerals may refer to like elements throughout. Thus, repeated descriptions may be omitted.

FIG. 1 is a diagram illustrating a direct current (DC)-DC converter according to exemplary embodiments of the present inventive concept.

Referring to FIG. 1, a DC-DC converter 10 may include a power switching circuit 100, a filter circuit 200 and a switch control signal generator 300.

The power switching circuit 100 includes a first switch circuit SWC1 and a second switch circuit SWC2 that are connected in parallel to a switching node NX. The first switch circuit SWC1 and the second switch circuit SWC2 may include a plurality of switch circuits that generate a switching voltage signal SVX through the switching node NX based on an input DC voltage VIN provided through an input node NI. Even though FIG. 1 illustrates two switch circuits SWC1 and SWC2, the power switching circuit 100 may include three or more switch circuits.

The filter circuit 200 filters the switching voltage signal SVX to generate an output DC voltage VOUT through an output node NO. In some exemplary embodiments of the present inventive concept, as illustrated in FIG. 1, the filter circuit 200 may be a low pass filter including at least one inductor L and at least one capacitor C. The filter circuit 200 is not limited to the configuration of FIG. 1, and thus, the filter circuit 200 may be implemented variously.

The switch control circuit 300 may generate a plurality of switch control signals SSW to control switching operations of the power switching circuit 100. In some exemplary embodiments of the present inventive concept, the switch control circuit 300 may be disposed outside of the DC-DC converter 10. The process of generating the plurality of switch control signals SSW will be described below.

The first switch circuit SWC1 may generate a first voltage signal SVX1 based on the input DC voltage VIN and the plurality of switch control signals SSW and apply the first voltage signal SVX1 to the switching node NX. The second switch circuit SWC2 may generate a second voltage signal SVX2 based on the input DC voltage VIN and the plurality of switch control signals SSW and apply the second voltage signal SVX2 to the switching node NX. Accordingly, the switching voltage signal SVX at the switching node NX may have a voltage level corresponding to an average of a voltage level of the first voltage signal SVX1 and a voltage level of the second voltage signal SVX2.

The first switch circuit SWC1 and the second switch circuit SWC2 may perform complementary switching operations to control the voltage level of the switching voltage signal SVX. In some exemplary embodiments of the present inventive concept, as will be described with reference to FIGS. 4 through 9C, the complementary switch operations may be implemented such that, when the first switch circuit SWC1 applies a first intermediate voltage VA to the switching node NX, the second switch circuit SWC2 applies a second intermediate voltage VB to the switching node NX. In addition, when the first switch circuit SWC1 applies the second intermediate voltage VB to the switching node NX, the second switch circuit SWC2 applies the first intermediate voltage VA to the switching node NX.

The first intermediate voltage VA and the second intermediate voltage VB may be equal to each other or different from each other depending on the configuration and the operation of the power switching circuit 100. An average of the first intermediate voltage VA and the second intermediate voltage VB may correspond to a half of the input DC voltage VIN, and thus, a half voltage of the input DC voltage VIN may be applied to the switching node NX.

As such, the power switching circuit 100 and the DC-DC converter 10 including the power switching circuit 100 may enhance voltage conversion efficiency without using feedback circuits by compensating effects from a mismatch of the power switching circuit 100 and a mismatch of the switch control signals SSW through complementary switching operations of the first and second switch circuits SWC1 and SWC2.

Figure 2:
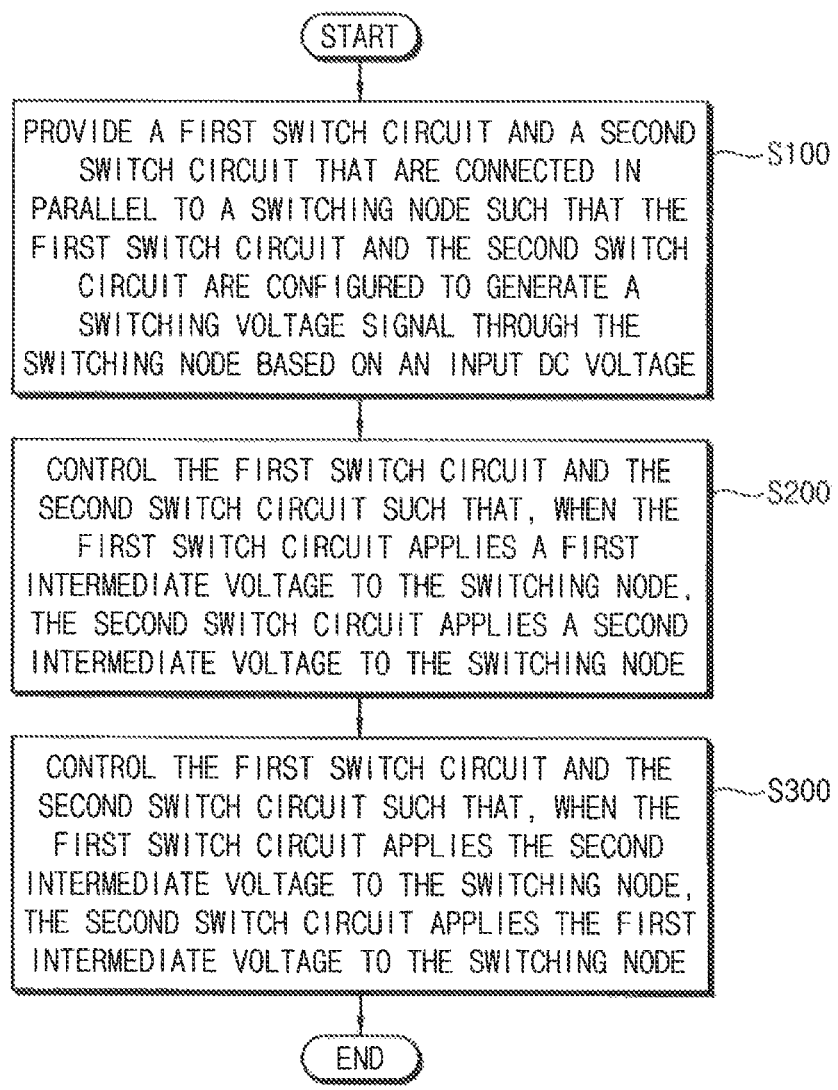
FIG. 2 is a flow chart illustrating a voltage conversion method according to exemplary embodiments of the present inventive concept.

FIG. 2 is a flow chart illustrating a voltage conversion method according to exemplary embodiments of the present inventive concept.

Referring to FIGS. 1 and 2, a first switch circuit SWC1 and a second switch circuit SWC2 are provided, which are connected in parallel to a switching node NX such that the first switch circuit SWC1 and the second switch circuit SWC2 are configured to generate a switching voltage signal SVX through the switching node NX based on an input DC voltage VIN (S100). The first switch circuit SWC1 and the second switch circuit SWC2 are controlled such that, when the first switch circuit SWC1 applies a first intermediate voltage VA to the switching node NX, the second switch circuit SWC2 applies a second intermediate voltage VB to the switching node NX (S200). In addition, the first switch circuit SWC1 and the second switch circuit SWC2 are controlled such that, when the first switch circuit SWC1 applies the second intermediate voltage VB to the switching node NX, the second switch circuit SWC2 applies the first intermediate voltage VA to the switching node NX (S300).

Such complementary switching operations of the first switch circuit SWC1 and the second switch circuit SWC2 may be implemented using a plurality of switching control signals SSW, as will be described below. In some exemplary embodiments of the present inventive concept, the plurality of switch control signals SSW may include switch signals to control switches included in the first switch circuit SWC1 and the second switch circuit SWC2, as will be described below with reference to FIGS. 3 through 13. In some exemplary embodiments of the present inventive concept, the plurality of switch control signals SSW may further include equalization signals to control electrical connections of flying capacitors included in the first switch circuit SWC1 and the second switch circuit SWC2, as will be described below with reference to FIGS. 4 through 18C.

Figure 3:
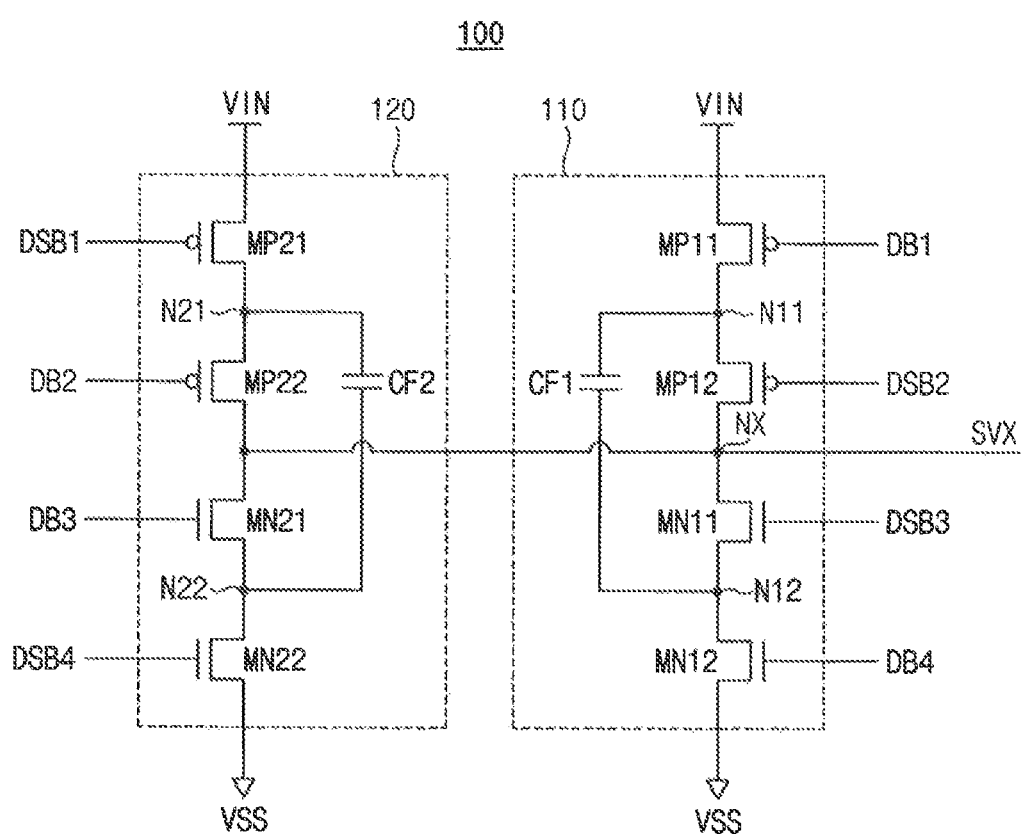
FIG. 3 is a circuit diagram illustrating a power switching circuit according to exemplary embodiments of the present inventive concept.

FIG. 3 is a circuit diagram illustrating a power switching circuit according to exemplary embodiments of the present inventive concept.

Referring to FIG. 3, a power switching circuit 100 may include a first switch circuit 110 and a second switch circuit 120.

The first switch circuit 110 may include a first switch MP11, a second switch MP12, a third switch MN11, a fourth switch MN12 and a first flying capacitor CF1. The first switch MP11 is connected between an input DC voltage VIN and a first node N1 and is configured to be turned on in response to a first switch signal DB1 applied to its gate. The second switch MP12 is connected between the first node N11 and the switching node NX and is configured to be turned on in response to a second switch signal DSB2 applied to its gate. The third switch MN11 is connected between the switching node NX and a second node N12 and is configured to be turned on in response to a third switch signal DSB3 applied to its gate. The fourth switch MN12 is connected between the second node N12 and a ground voltage VSS and is configured to be turned on in response to a fourth switch signal DB4 applied to its gate. The first flying capacitor CF1 is connected between the first node N11 and the second node N12

The second switch circuit 120 includes a fifth switch MP21, a sixth switch MP22, a seventh switch MN21, an eighth switch MN22 and a second flying capacitor CF2. The fourth switch MP21 is connected between the input DC voltage VIN and a third node N21 and is configured to be turned on in response to a fifth switch signal DSB1 applied to its gate. The sixth switch MP22 is connected between the third node N21 and the switching node NX and is configured to be turned on in response to a sixth switch signal DB2 applied to its gate. The seventh switch MN21 is connected between the switching node NX and a fourth node N22 and is configured to be turned on in response to a seventh switch signal DB3 applied to its gate. The eighth switch MN22 is connected between the fourth node N22 and the ground voltage VSS and is configured to be turned on in response to an eighth switch signal DSB4 applied to its gate. The second flying capacitor CF2 is connected between the third node N21 and the fourth node N22.

The first through eighth switch signals DS1~DS4 and DSB1~DSB4 may be included in the plurality of switch control signals SSW shown in FIG. 1.

In some exemplary embodiments of the present inventive concept, as illustrated in FIG. 3, the first switch MP11, the second switch MP12, the fifth switch MP21 and the sixth switch MP22 may be P-channel metal oxide semiconductor (PMOS) transistors, and the third switch MN11, the fourth switch MN12, the seventh switch MN21 and the eighth switch MN22 may be N-channel metal oxide semiconductor (NMOS) transistors.

The first switch circuit 110 and the second switch circuit 120 may have substantially the same operation characteristics. In other words, the first switch MP11 and the fifth switch MP21 may have the same size, the second switch MP12 and the sixth switch MP22 may have the same size, the third switch MN11 and the seventh switch MN21 may have the same size, the fourth switch MN12 and the eighth switch MN22 may have the same size, and the first flying capacitor CF1 and the second flying capacitor CF2 may have the same capacitance value. In this case, a capacitor voltage VCF between both electrodes of the first flying capacitor CF1 may be substantially the same as that of the second flying capacitor CF2.

The first switch circuit 110 and the second switch circuit 120 may control the voltage level of a switching voltage signal SVX at the switching node NX through complementary switching operations using the first through eighth switch signals DB1~DB4 and DSB1~DSB4.

Figure 4:
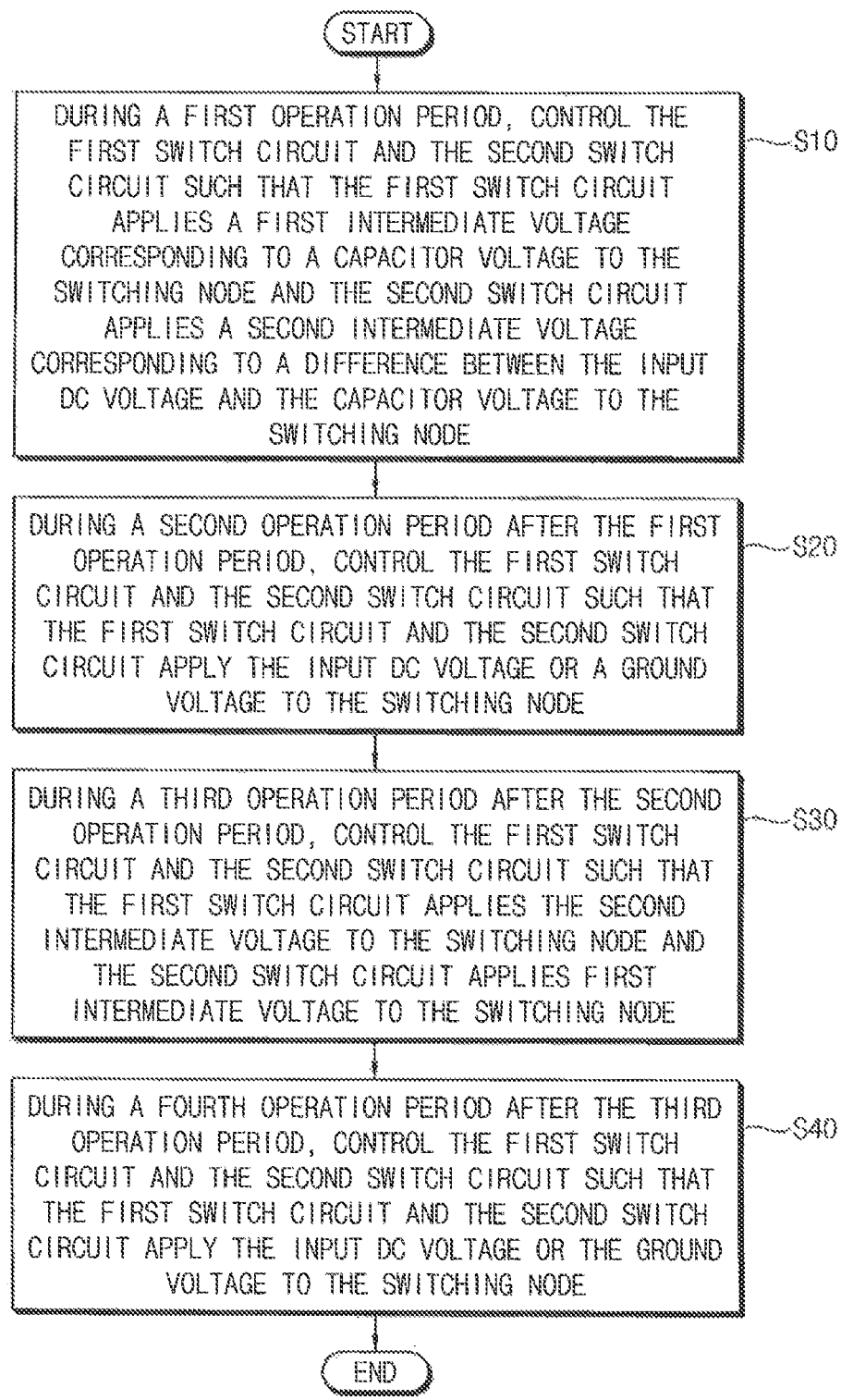
FIG. 4 is a flow chart illustrating a method of controlling a power switching circuit according to exemplary embodiments of the present inventive concept.

FIG. 4 is a flow chart illustrating a method of controlling a power switching circuit according to exemplary embodiments of the present inventive concept.

The operations of the power switching circuit 100 may be performed periodically. For example, each operation cycle of the power switching circuit 100 may sequentially include a first operation period D1, a second operation period D2, a third operation period D3 and a fourth operation period D4.

Referring to FIGS. 3 and 4, during the first operation period D1, the power switching circuit 100 may be controlled such that the first switch circuit 110 applies a first intermediate voltage VA corresponding to a capacitor voltage VCF to the switching node NX and the second switch circuit 120 applies a second intermediate voltage VB corresponding to a difference between the input DC voltage VIN and the capacitor voltage VCF to the switching node NX (S10).

During the second operation period D2 after the first operation period D1, the power switching circuit 100 may be controlled such that the first switch circuit 110 and the second switch circuit 120 apply the input DC voltage VIN or a ground voltage VSS to the switching node NX (S20).

During the third operation period D3 after the second operation period D2, the power switching circuit 100 may be controlled such that the first switch circuit 110 applies the second intermediate voltage VB to the switching node NX and the second switch circuit 120 applies the first intermediate voltage VA to the switching node NX (S30).

During the fourth operation period D4 after the third operation period D3, the power switching circuit 100 may be controlled such that the first switch circuit 110 and the second switch circuit 120 apply the input DC voltage VIN or the ground voltage VSS to the switching node NX (S40).

The exemplary embodiments of the present inventive concept relate to conversion of DC voltages, and more particularly to compensating effects of a mismatch in a high-efficiency three-level buck converter that converts a relatively high DC voltage to a relatively low DC voltage. The 3-level buck converter may be configured such that a flying capacitor and power switches are added between an input voltage and an inductor to enhance voltage conversion efficiency. However, the voltage of the flying capacitor may vary due to mismatches of the power switches and the gate signals of the power switches, thereby causing efficiency degradation and overvoltage of the power switches. An additional feedback circuit may be used to compensate the effects of the mismatches; however, the configuration of the DC-DC converter is complicated and performance may vary depending on operation conditions of the DC-DC converter. According to exemplary embodiments of the present inventive concept, the mismatch effects of the 3-level buck converter may be efficiently and robustly compensated by using a plurality of switch circuits that perform complementary switching operations FIG. 5 is a timing diagram illustrating a first operation mode of the power switching circuit of FIG. 3, and FIGS. 6A, 6B and 6C are diagrams illustrating switching operations in the first operation mode of the power switching circuit of FIG. 3.

Figure 5:
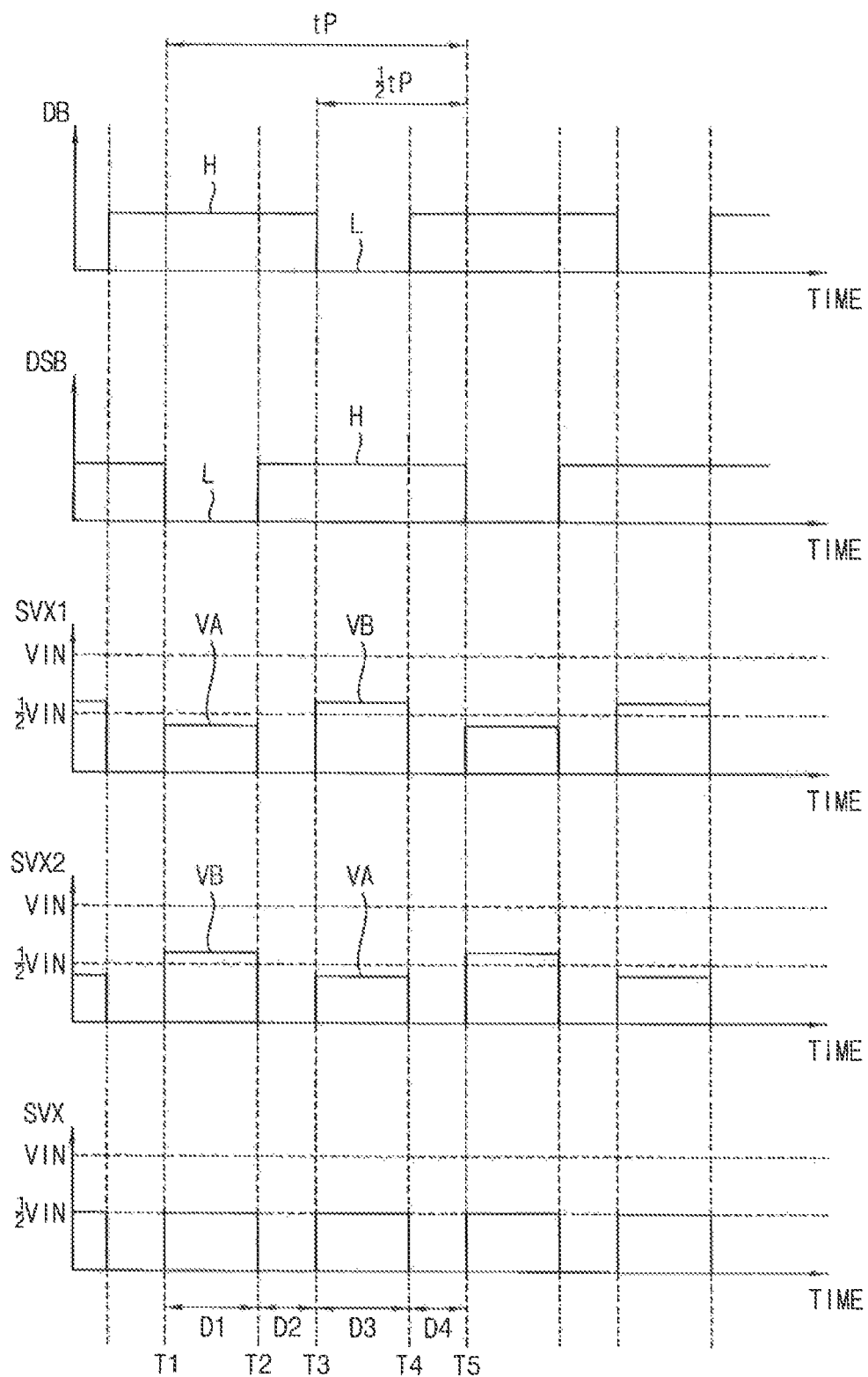
FIG. 5 is a timing diagram illustrating a first operation mode of the power switching circuit of FIG. 3.
Figure 6A:
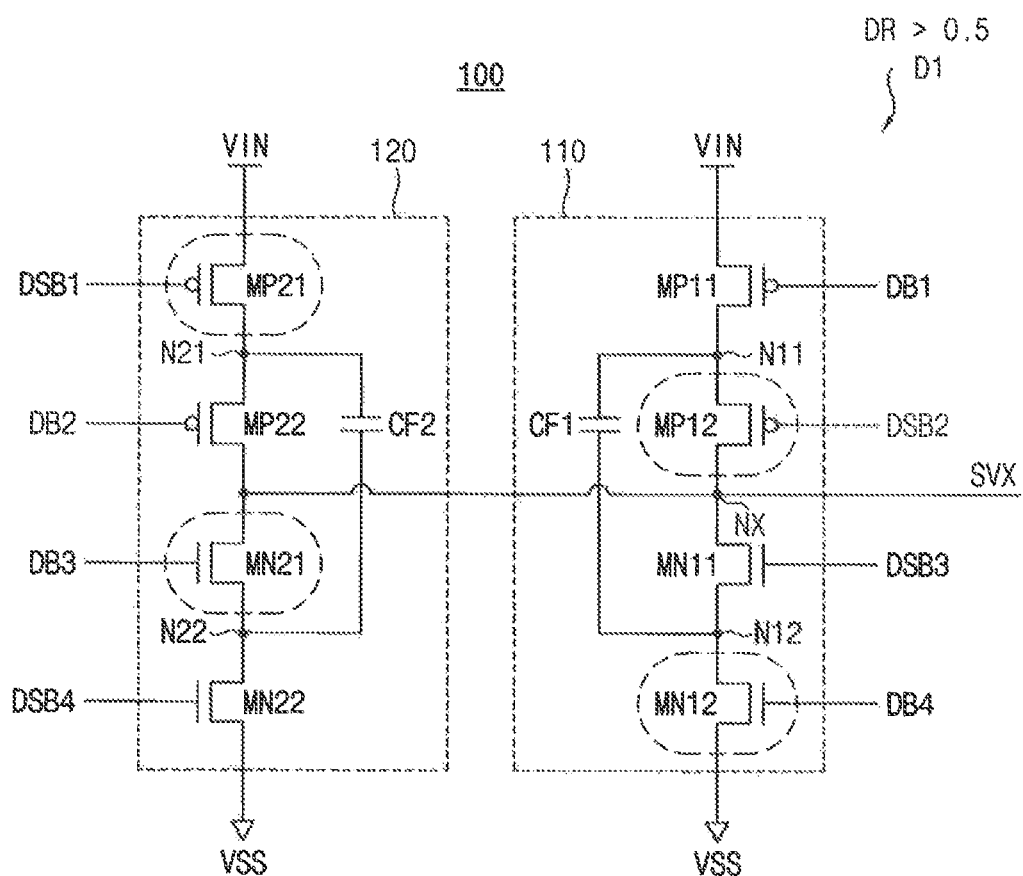
FIGS. 6A, 6B and 6C are diagrams illustrating switching operations in the first operation mode of the power switching circuit of FIG. 3.
Figure 6B:
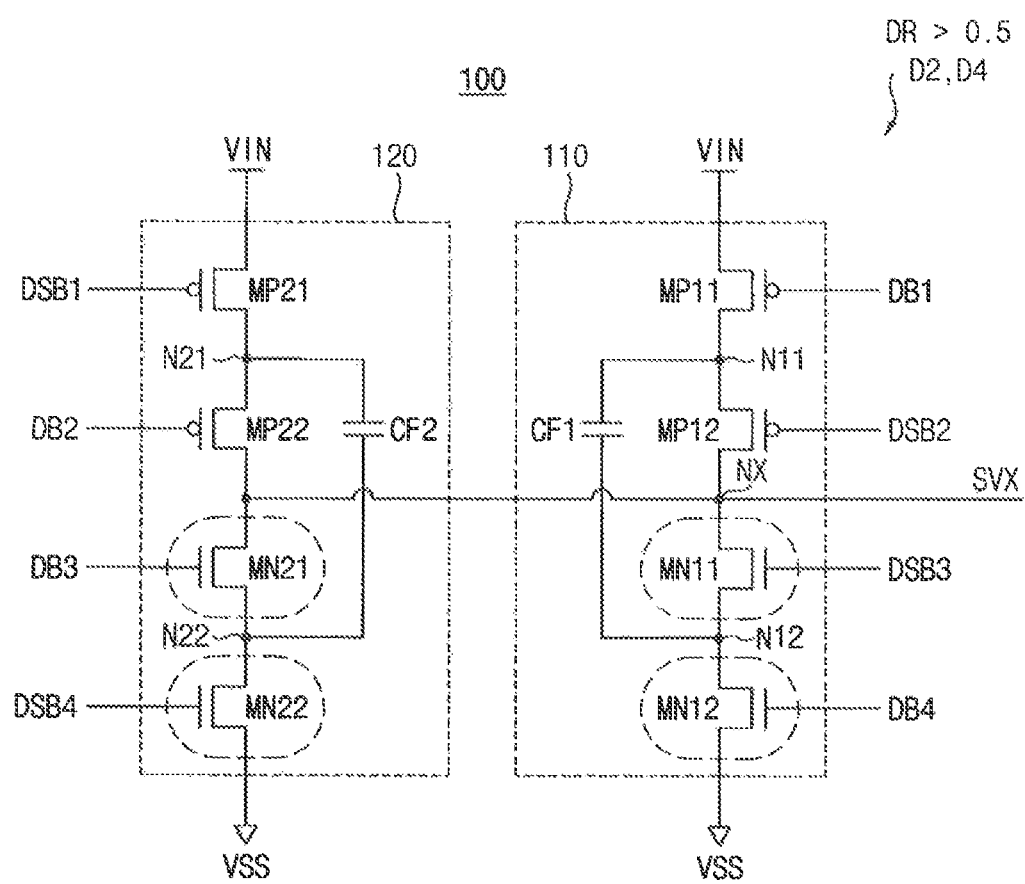
Figure 6C:
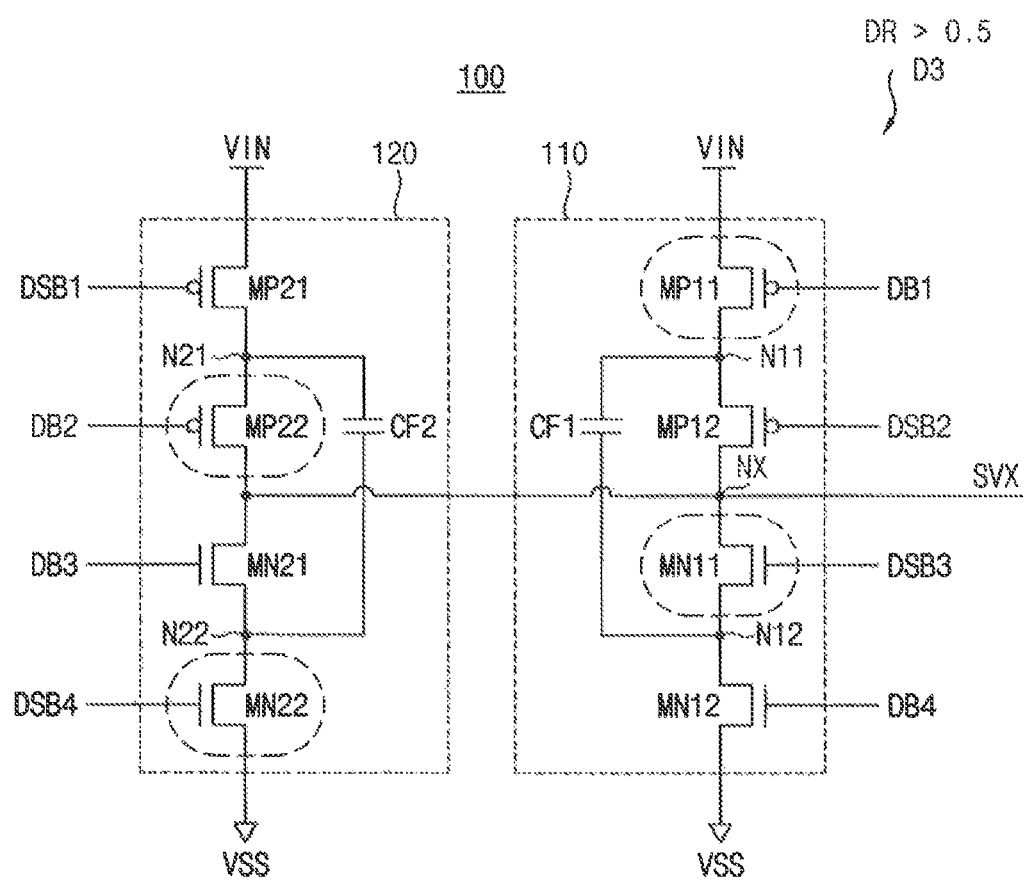

FIGS. 5, 6A, 6B and 6C illustrate a first operation mode when a duty ratio or a duty cycle of the first through eighth switch signals DB1~DB4 and DSB1~DSB4 is greater than 0.5. In the first operation mode as illustrated in FIG. 5, the switching voltage signal SVX at the switching node NX may have a half voltage VIN/2 of the input DC voltage VIN and the ground voltage VSS alternately, and thus, the output DC voltage shown in FIG. 1 may be lower than the half voltage VIN/2. The operations of the power switching circuit 100 may be periodical and each operation cycle tP may sequentially include first through forth operation periods D1~D4. FIG. 6A illustrates the switching operation of the power switching circuit 100 in the first operation period D1, FIG. 6B illustrates the switching operation of the power switching circuit 100 in the second and fourth operation periods D2 and D4, and FIG. 6C illustrates the switching operation of the power switching circuit 100 in the third operation period D3. In FIGS. 6A, 6B and 6C, the switches that are turned on in each operation period are circled by dashes.

In some exemplary embodiments of the present inventive concept, at least a portion of the first through eighth switch signals DB1~DB4 and DSB1~DSB4 may have the same timings. For example, the first switch signal DB1, the fourth switch signal DB4, the sixth switch signal DB2 and the seventh switch signal DB3 may be activated simultaneously, and the second switch signal DSB2, the third switch signal DSB3, the fifth switch signal DSB1 and the eighth switch signal DSB4 may be activated simultaneously. A first switch control signal DB in FIG. 5 may correspond to the first switch signal DB1, the fourth switch signal DB4, the sixth switch signal DB2 and the seventh switch signal DB3, and a second switch control signal DSB in FIG. 5 may correspond to the second switch signal DSB2, the third switch signal DSB3, the fifth switch signal DSB1 and the eighth switch signal DSB4.

Referring to FIGS. 5 and 6A, in response to the first switch control signal DB and the second switch control signal DSB in the first operation period D1, the second switch MP12, the fourth switch MN12, the fifth switch MP21 and the seventh switch MN21 are turned on, and the first switch MP11, the third switch MN11, the sixth switch MP22 and the eighth switch MN22 are turned off. Through the switching operations of FIG. 6A, a voltage level of a first voltage signal SVX1 applied by the first switch circuit 110 becomes the first intermediate voltage VA and a voltage level of a second voltage signal SVX2 applied by the second switch circuit 120 becomes the second intermediate voltage VB. If the capacitor voltage VCF between both electrodes of the first flying capacitor CF1 is the same as that of the second flying capacitor CF2, the first intermediate voltage VA and the second intermediate voltage VB may be represented by Expression 1.

$VA = VCF$ $VB = VIN - VCF$          Expression 1

A voltage level of the switching voltage signal SVX generated through the switching node NX may be an average voltage of the first intermediate voltage VA and the second intermediate voltage VB, and thus, the half voltage VIN/2 of the input DC voltage VIN may be applied to the switching node NX in the first operation period D1.

Referring to FIGS. 5 and 6B, in response to the first switch control signal DB and the second switch control signal DSB in the second operation period D2, the third switch MN11, the fourth switch MN12, the seventh switch MN21 and the eighth switch MN22 are turned on, and the first switch MP11, the second switch MP12, the fifth switch MP21 and the sixth switch MP22 are turned off. Through the switching operations of FIG. 6B, the voltage level of the first voltage signal SVX1 applied by the first switch circuit 110 and the voltage level of the second voltage signal SVX2 applied by the second switch circuit 120 becomes the ground voltage VSS (e.g., 0V), and thus, the ground voltage VSS may be applied to the switching node NX in the second operation period D2.

Referring to FIGS. 5 and 6C, in response to the first switch control signal DB and the second switch control signal DSB in the third operation period D3, the first switch MP11, the third switch MN11, the sixth switch MP22 and the eighth switch MN22 are turned on, and the second switch MP12, the fourth switch MN12, the fifth switch MP21 and the seventh switch MN21 are turned off. Through the switching operations of FIG. 6C, the voltage level of the first voltage signal SVX1 applied by the first switch circuit 110 becomes the second intermediate voltage VB and the voltage level of the second voltage signal SVX2 applied by the second switch circuit 120 becomes the first intermediate voltage VA. As a result, the half voltage VIN/2 of the input DC voltage VIN may be applied to the switching node NX in the third operation period D3 as well as the first operation period D1.

The switching operations of the fourth operation period D4 are the same as the second operation period D2, and thus, the ground voltage VSS may be applied to the switching node NX in the fourth operation period D4.

As can be seen, the complementary switching operations may be performed such that, when the first switch circuit 110 applies the first intermediate voltage VA to the switching node NX, the second switch circuit 120 may apply the second intermediate voltage VB to the switching node NX in the first operation period D1, and when the first switch circuit 110 applies the second intermediate voltage VB to the switching node NX, the second switch circuit 120 may apply the first intermediate voltage VA to the switching node NX in the third operation period D3. Accordingly, even though each of the first switch circuit 110 and the second switch circuit 120 is affected by various mismatches, the switching voltage signal SVX of the switching node NX may have the voltage levels of the half voltage VIN/2 of the input DC voltage VIN and the ground voltage VSS, regularly.

When a low-drop out circuit converts a high DC voltage to a low DC voltage, the voltage difference directly affects power loss, and thus, the efficiency of the DC voltage conversion is limited as the difference between the input DC voltage and the output DC voltage increases.

A conventional 2-level buck converter operates such that a PMOS switch and an NMOS switch are turned on alternately during each operation cycle. During the first operation period in each operation cycle, the PMOS switch is turned on, a switching node is connected to an input voltage, and an output voltage is supplied while charging an inductor. During the second operation period in each operation cycle, the NMOS switch is turned on, the switching node is connected to a ground node, and energy charged in the inductor is provided as the output voltage. The output voltage of the conventional buck converter is represented by the duty ratio of the input voltage and the switch signal. The voltage conversion efficiency of the 2-level buck converter is relatively high, but the current ripple of the inductor increases as the difference of the input voltage and the output voltage increases. The current ripple limits the voltage conversion efficiency by increasing the root mean square (RMS) loss due to the parasitic DC resistance of the inductor. In addition, when the PMOS switch is turned on, the voltage applied to both ends of the inductor corresponds to the input voltage and the output voltage. In this case, power loss due to the parasitic resistance of the inductor occurs. As a result, the efficiency of the 2-level buck converter is limited as the difference of the input voltage and the output voltage increases. Accordingly, a circuit for lowering the voltage applied to the switching node is required.

The 3-level buck converter may be used in place of the 2-level buck converter. The 3-level buck converter uses the additional flying capacitor and the voltage charged to both electrodes of the flying capacitor may be a half of the input voltage. The voltage of the switching node of the 3-level buck converter may be reduced by a half of the voltage of the switching node of the 2-level buck converter. In addition, the actual operation frequency of the 3-level buck converter is double that of the 2-level buck converter. The voltage applied to both ends of the inductor of the 3-level buck converter may be reduced, and thus, the current ripple of the inductor and the power consumption due to the parasitic resistance may be reduced. The 3-level buck converter may be used in a system requiring a large difference between the input voltage and the output voltage and high voltage conversion efficiency.

It is important to maintain the voltage between both electrodes of the flying capacitor at a half of the input voltage. However, the voltage charged in the flying capacitor may be varied per switching cycle due to parameter variation and mismatch of the power switches, as well as mismatch of the switch control signals. Even though the average of the capacitor voltage may be a half of the input voltage VIN, the real voltages for the respective switching cycles may deviate from the half voltage VIN/2. Such an imbalance with the voltage of the flying capacitor may increase RMS loss and cause damage to the power switches.

In comparison with the conventional 3-level buck converter having one switch circuit, at least two switch circuits are used in a self-balancing scheme through complementary switching operations according to exemplary embodiments of the present inventive concept. The two switch circuits may operate complementarily to be affected by opposing mismatch effects.

The 3-level buck converter without a feedback circuit according to exemplary embodiments of the present inventive concept may include the two flying capacitors but the total size of the two flying capacitors may be the same as the one flying capacitor of the conventional 3-level buck converter. By downsizing the switches in the two switch circuits, the total size of the two switch circuits in the 3-level buck converter according to exemplary embodiments of the present inventive concept may have the same size as the one switch circuit in the conventional 3-level buck converter. The flying capacitors of the present inventive concept may be implemented as off-chip elements or integrated inside a chip, and thus, the additional flying capacitor may not significantly affect the performance and cost of the power switching circuit. According to exemplary embodiments of the present inventive concept, design difficulty of the 3-level buck converter may be reduced, the power consumption thereof may be reduced by removing the additional feedback circuit, and a robust balancing operation may be realized with respect to various operation environments. The removal of the additional feedback circuit may also reduce the chip size and cost of the 3-level buck converter.

Figure 7A:
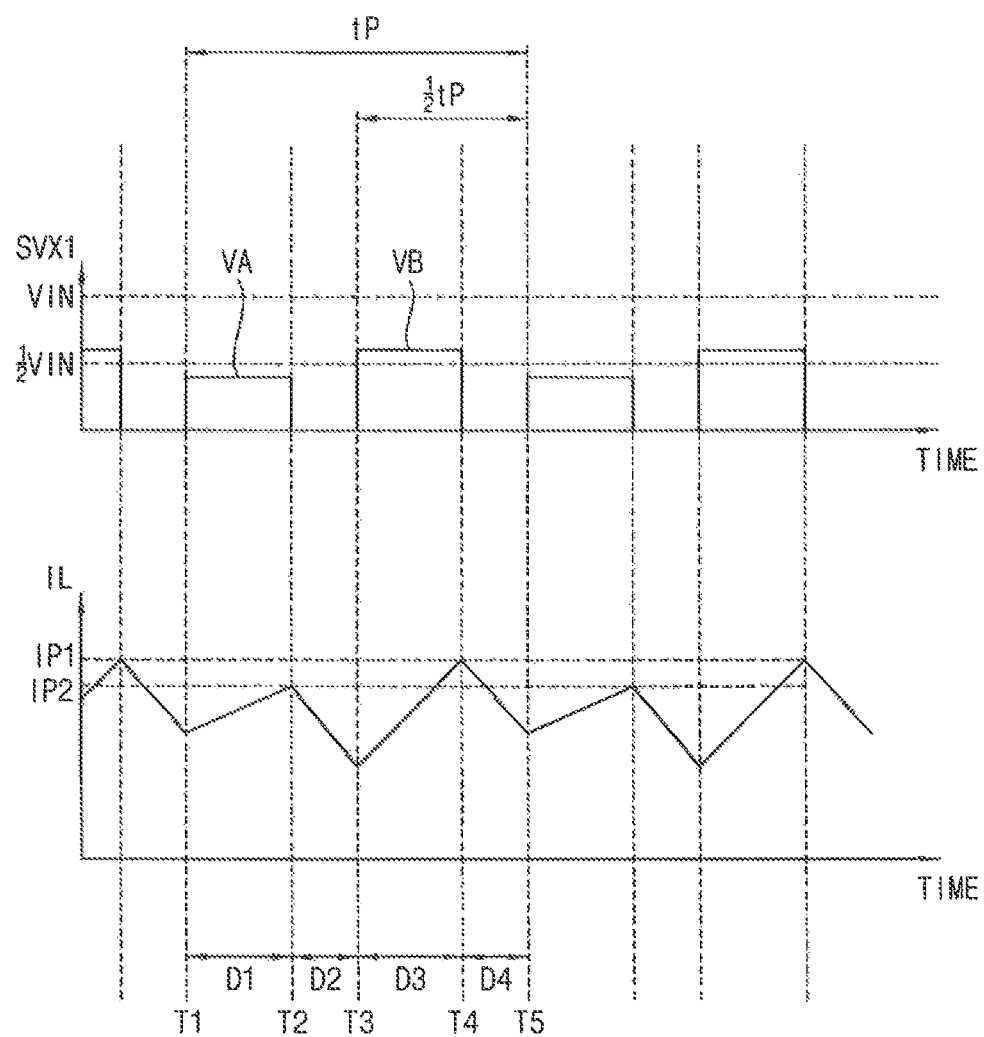
FIGS. 7A and 7I are diagrams for describing power consumption of a DC-DC converter.
Figure 7B:
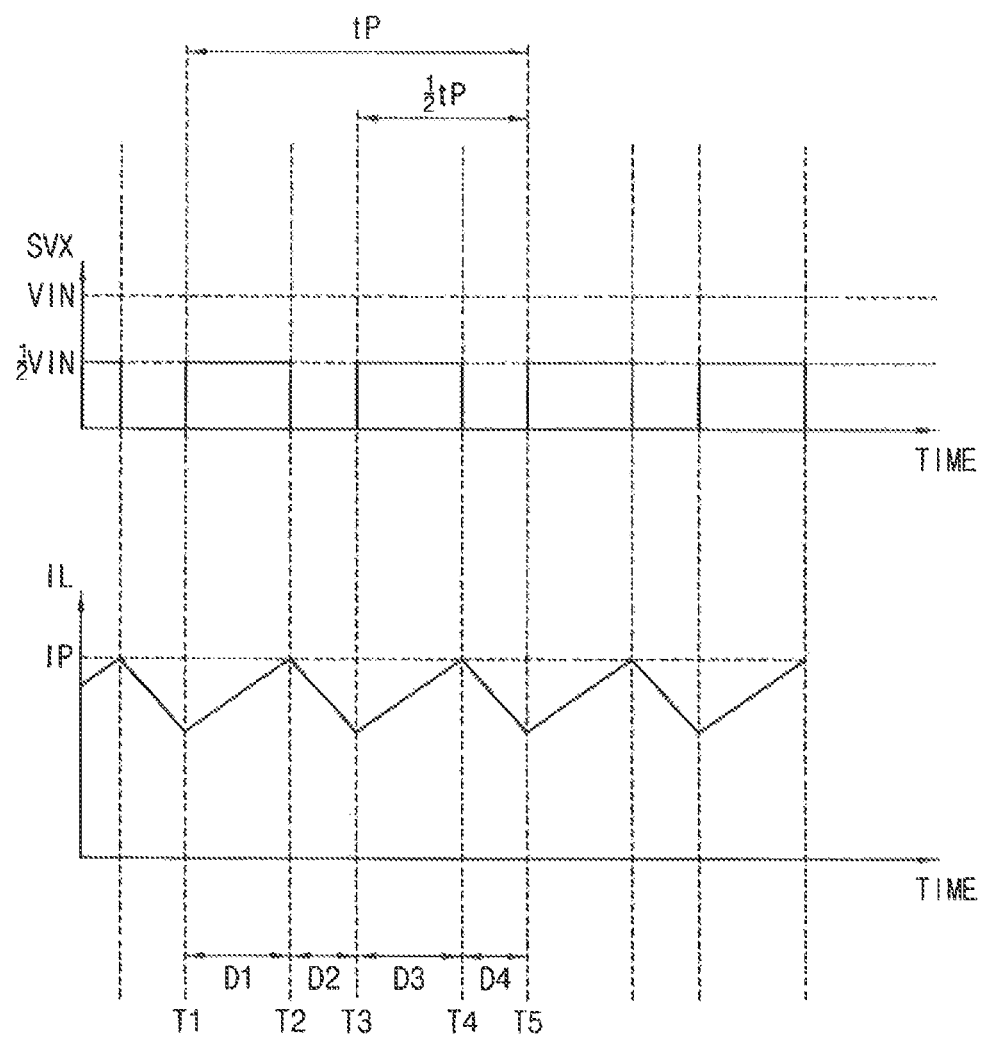

FIGS. 7A and 7B are diagrams for describing power consumption of a DC-DC converter.

Referring to FIG. 7A, when a mismatch occurs in a 3-level buck converter using one switch circuit, for example, the first switch circuit 110, the switching voltage signal SVX1 of the switching node NX alternates irregularly between the first intermediate voltage VA and the second intermediate voltage VB, and thus, the waveform of the inductor current IL may be irregular. In other words, the peak currents IP1 and IP2 of the inductor may appear irregularly as shown in FIG. 7A. The power consumption may be increased due to the high voltage and the MOS transistors used as switching elements may be damaged. As described above, if the additional feedback circuit is used to compensate the mismatch effects, the design may be complicated and robust compensation may not be secured because the feedback circuit may operate differently depending on its operation environment.

Referring to FIG. 7B, in the 3-level buck converter that performs the complementary switching operations according to exemplary embodiments of the present inventive concept, the mismatches of the two switch circuits may be cancelled due to the complementary operations of the two switch circuits as illustrated in FIG. 7B. In other words, the switching voltage signal SVX at the switching node NX may maintain the half voltage VIN/2 corresponding to the average of the first intermediate voltage VA and the second intermediate voltage VB and thus the peak currents IP of the inductor may be maintained regularly.

Figure 8:
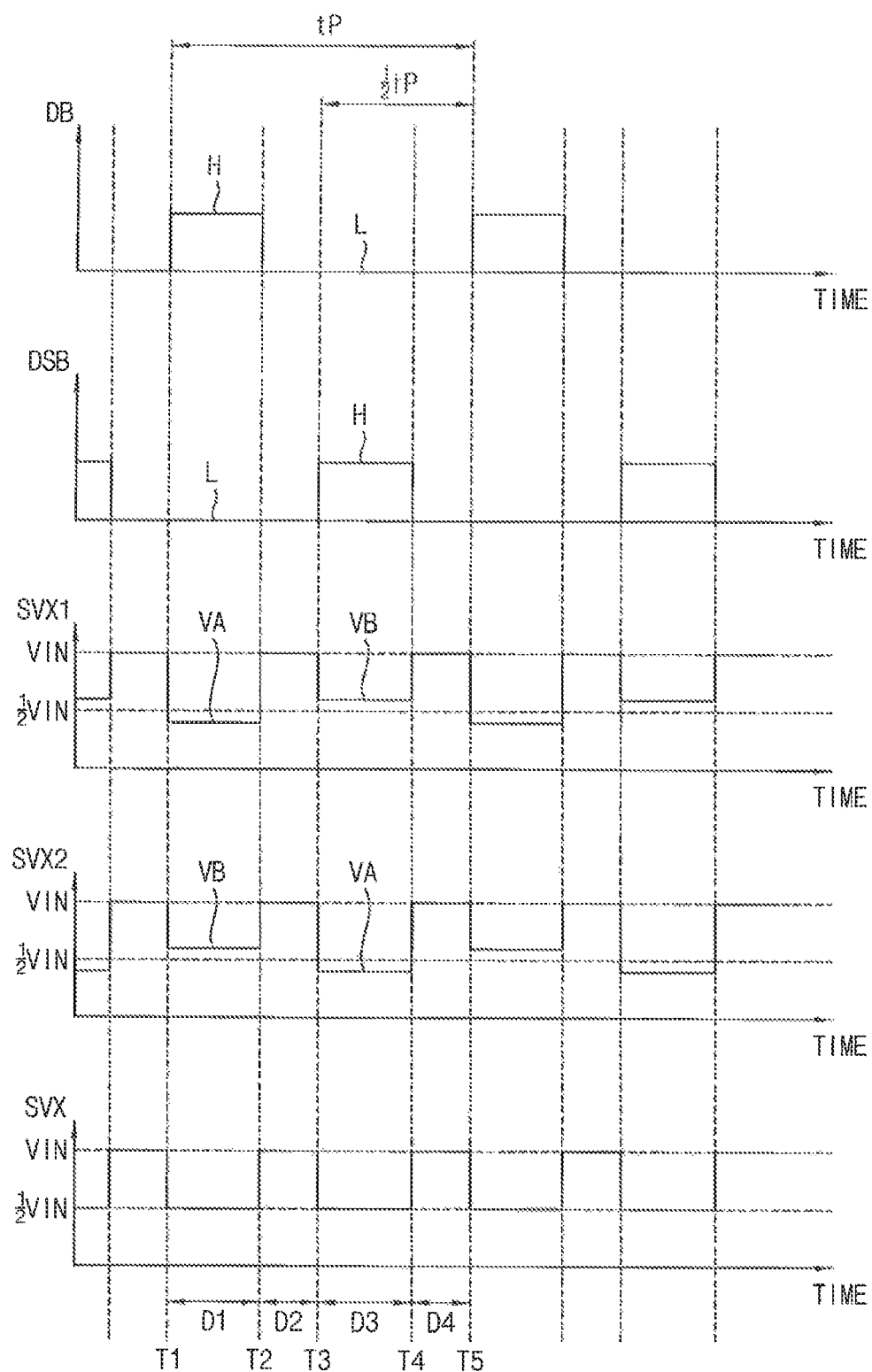
FIG. 8 is a timing diagram illustrating a second operation mode of the power switching circuit of FIG. 3.

FIG. 8 is a timing diagram illustrating a second operation mode of the power switching circuit of FIG. 3, and FIGS. 9A, 9B and 9C are diagrams illustrating switching operations in the second operation mode of the power switching circuit of FIG. 3.

Figure 9A:
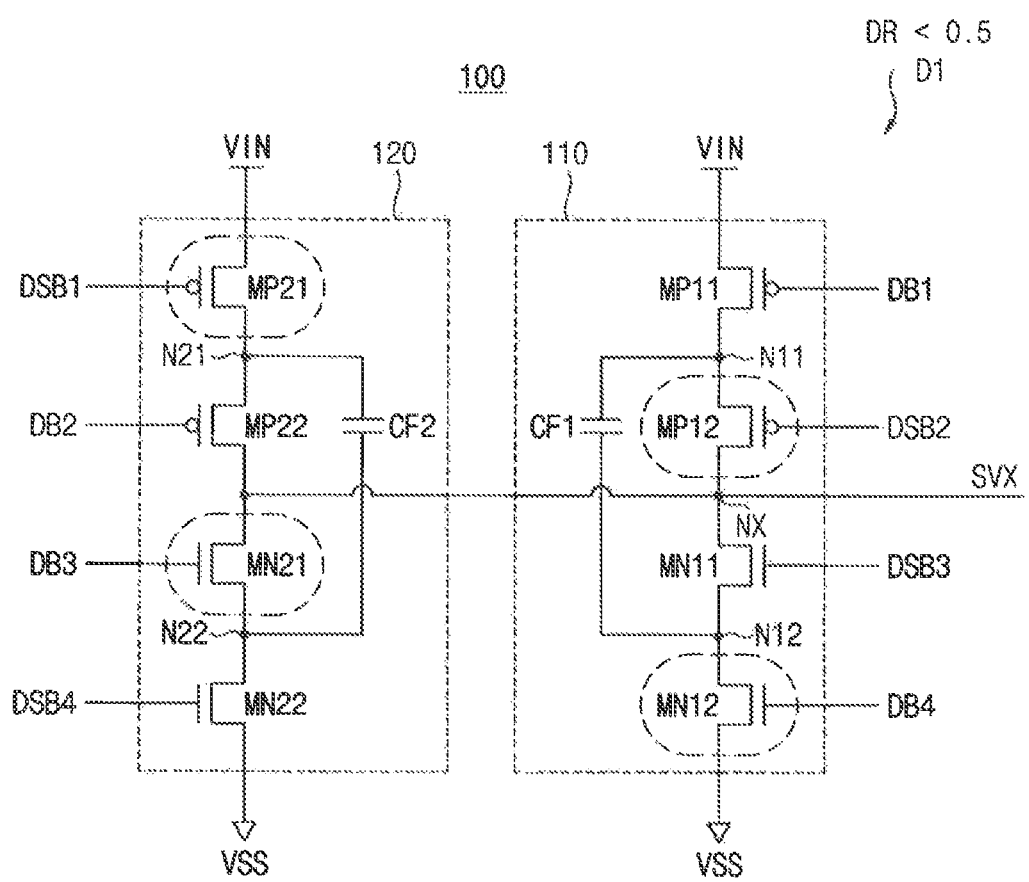
FIGS. 9A, 9B and 9C are diagrams illustrating switching operations in the second operation mode of the power switching circuit of FIG. 3.
Figure 9B:
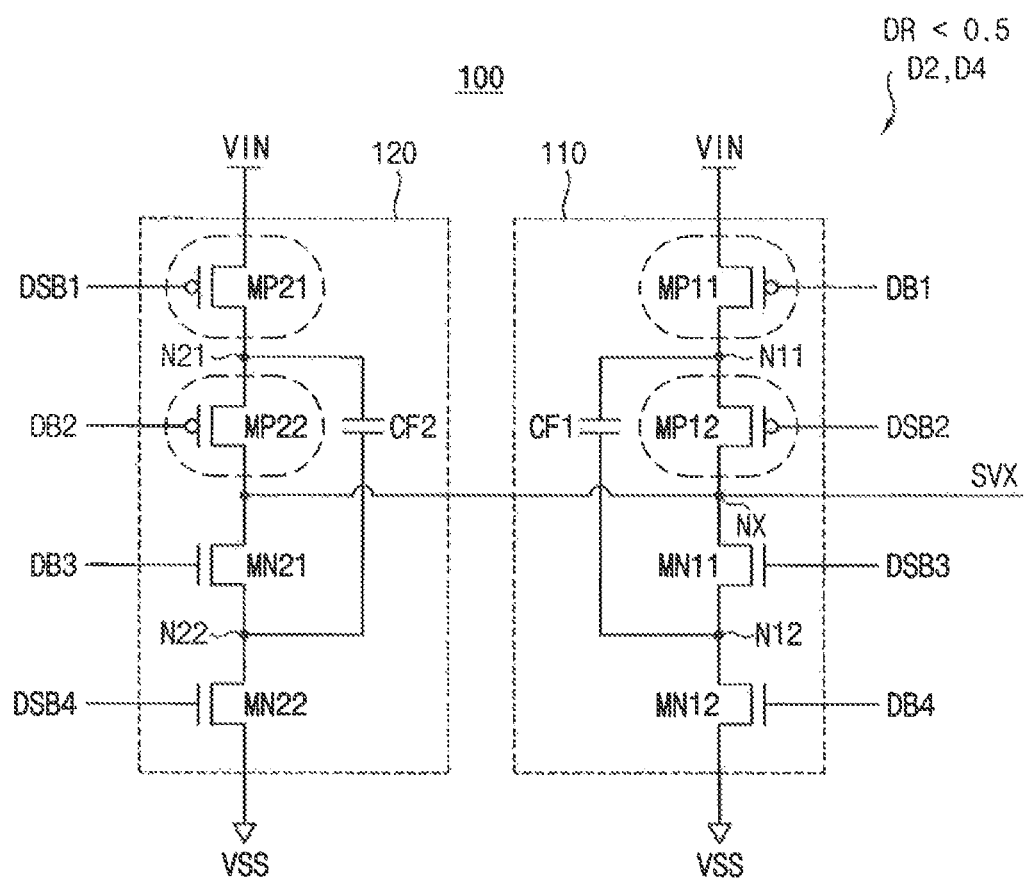
Figure 9C:
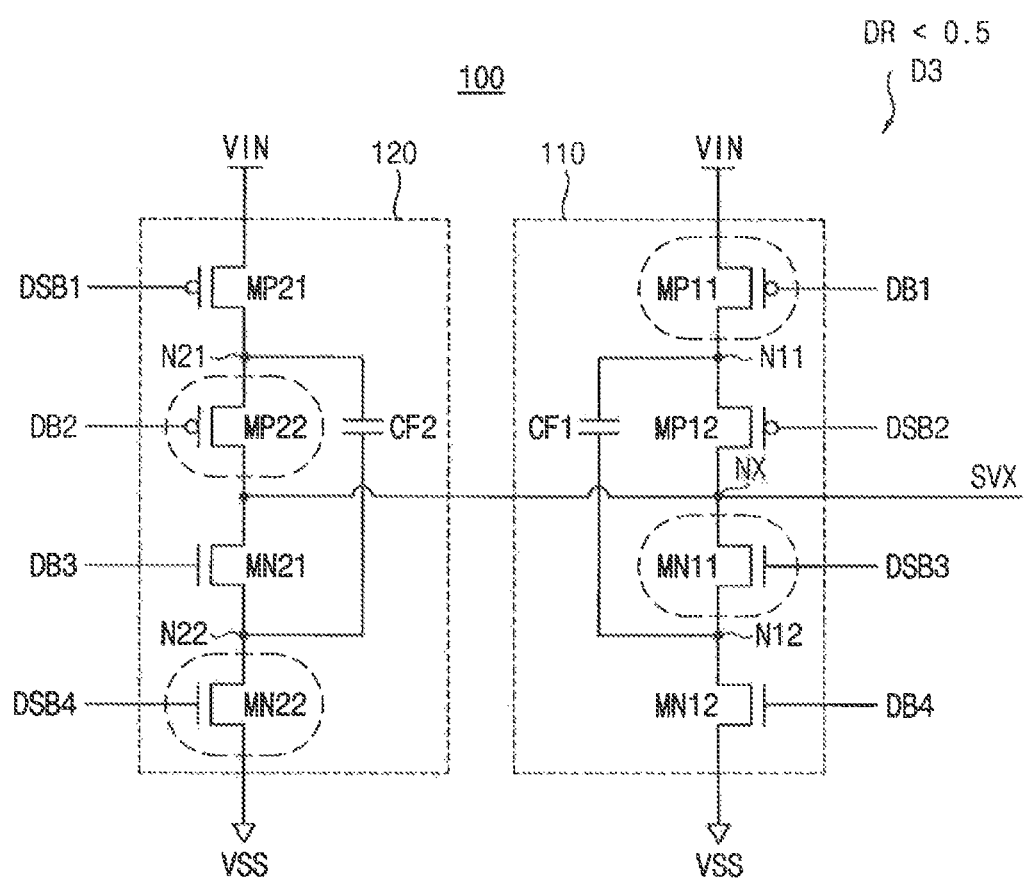

FIGS. 8, 9A, 9B and 9C illustrate a second operation mode when a duty ratio or a duty cycle of the first through eighth switch signals DB1~DB4 and DSB1~DSB4 is smaller than 0.5. In the second operation mode as illustrated in FIG. 8, the switching voltage signal SVX at the switching node NX may have a half voltage VIN/2 of the input DC voltage VIN and the input DC voltage VIN alternately, and thus, the output DC voltage VOUT shown in FIG. 1 may be higher than the half voltage VIN/2. The operations of the power switching circuit 100 may be periodical and each operation cycle tP may sequentially include first through forth operation periods D1~D4. FIG. 9A illustrates the switching operation of the power switching circuit 100 in the first operation period D1, FIG. 9B illustrates the switching operation of the power switching circuit 100 in the second and fourth operation periods D2 and D4, and FIG. 9C illustrates the switching operation of the power switching circuit 100 in the third operation period D3. In FIGS. 9A, 9B and C, the switches that are turned on in each operation period are circled by dashes.

In some exemplary embodiments of the present inventive concept, at least a portion of the first through eighth switch signals DB1~DB4 and DSB1~DSB4 may have the same timings. For example, the first switch signal DB1, the fourth switch signal D134, the sixth switch signal DB2 and the seventh switch signal DB3 may be activated simultaneously, and the second switch signal DSB2, the third switch signal DSB3, the fifth switch signal DSB1 and the eighth switch signal DSB4 may be activated simultaneously. A first switch control signal DB in FIG. 8 may correspond to the first switch signal DB1, the fourth switch signal DB4, the sixth switch signal DB2 and the seventh switch signal DB3, and a second switch control signal DSB in FIG. 8 may correspond to the second switch signal DSB2, the third switch signal DSB3, the fifth switch signal DSB1 and the eighth switch signal DSB4.

Referring to FIGS. 8 and 9A, in response to the first switch control signal DB and the second switch control signal DSB in the first operation period D1, the second switch MP12, the fourth switch MN12, the fifth switch MP21 and the seventh switch MN21 are turned on, and the first switch MP11, the third switch MN11, the sixth switch MP22 and the eighth switch MN22 are turned off. Through the switching operations of FIG. 9A, a voltage level of a first voltage signal SVX1 applied by the first switch circuit 110 becomes the first intermediate voltage VA and a voltage level of a second voltage signal SVX2 applied by the second switch circuit 120 becomes the second intermediate voltage VB. If the capacitor voltage VCF between both electrodes of the first flying capacitor CF1 is the same as that of the second flying capacitor CF2, the first intermediate voltage VA and the second intermediate voltage VB may be represented by Expression 1, as described above.

A voltage level of the switching voltage signal SVX generated through the switching node NX may be an average voltage of the first intermediate voltage VA and the second intermediate voltage VB, and thus, the half voltage VIN/2 of the input DC voltage VIN may be applied to the switching node NX in the first operation period D1.

Referring to FIGS. 8 and 9B, in response to the first switch control signal DB and the second switch control signal DSB in the second operation period D2, the first switch MP11, the second switch MP12, the fifth switch MP21 and the sixth switch MP22 are turned on, and the third switch MN11, the fourth switch MN12, the seventh switch MN21 and the eighth switch MN22 are turned off. Through the switching operations of FIG. 9B, the voltage level of the first voltage signal SVX1 applied by the first switch circuit 110 and the voltage level of the second voltage signal SVX2 applied by the second switch circuit 120 becomes the input DC voltage VIN, and thus, the input DC voltage VIN may be applied to the switching node NX in the second operation period D2.

Referring to FIGS. 8 and 9C, in response to the first switch control signal DB and the second switch control signal DSB in the third operation period D3, the first switch MP11, the third switch MN11, the sixth switch MP22 and the eighth switch MN22 are turned on, and the second switch MP12, the fourth switch MN12, the fifth switch MP21 and the seventh switch MN21 are turned off. Through the switching operations of FIG. 9C, the voltage level of the first voltage signal SVX1 applied by the first switch circuit 110 becomes the second intermediate voltage VB and the voltage level of the second voltage signal SVX2 applied by the second switch circuit 120 becomes the first intermediate voltage VA. As a result, the half voltage VIN/2 of the input DC voltage VIN may be applied to the switching node NX in the third operation period D3 as well as the first operation period D1.

The switching operations of the fourth operation period D4 are the same as the second operation period D2, and thus, the input DC voltage VIN may be applied to the switching node NX in the fourth operation period D4.

As can be seen, the complementary switching operations may be performed such that, when the first switch circuit 110 applies the first intermediate voltage VA to the switching node NX, the second switch circuit 120 may apply the second intermediate voltage VB to the switching node NX in the first operation period D1, and when the first switch circuit 110 applies the second intermediate voltage VB to the switching node NX, the second switch circuit 120 may apply the first intermediate voltage VA to the switching node NX in the third operation period D3. Accordingly, even though each of the first switch circuit 110 and the second switch circuit 120 is affected by various mismatches, the switching voltage signal SVX of the switching node NX may have the voltage levels of the half voltage VIN/2 of the input DC voltage VIN and the input DC voltage VIN, regularly.

Figure 10:
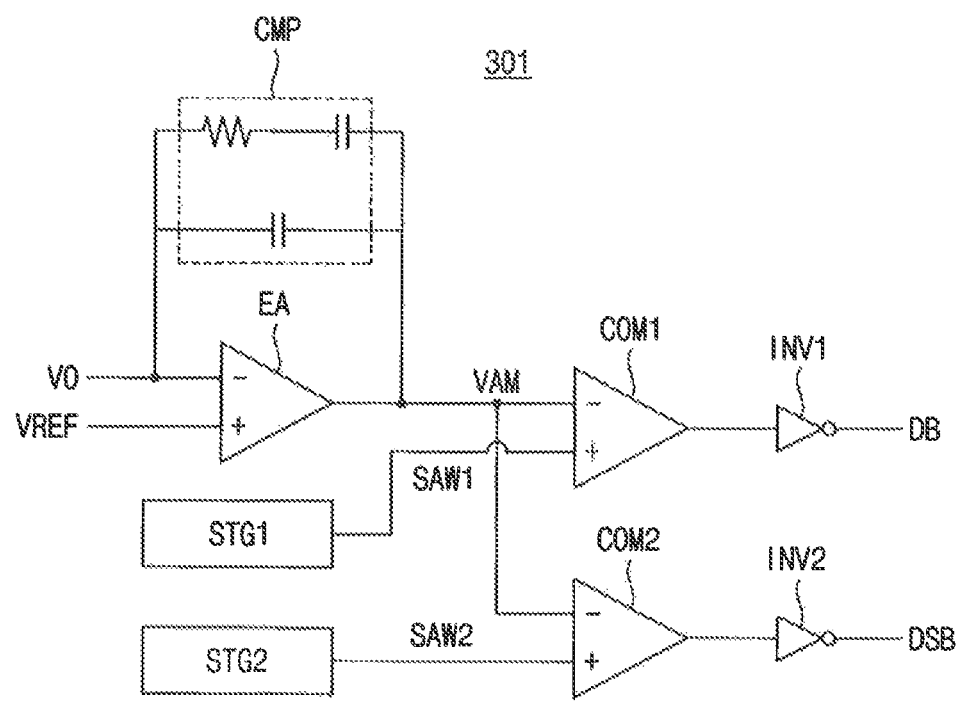
FIG. 10 is a diagram illustrating a switch control circuit included in a DC-DC converter according to exemplary embodiments of the present inventive concept.
Figure 11A:
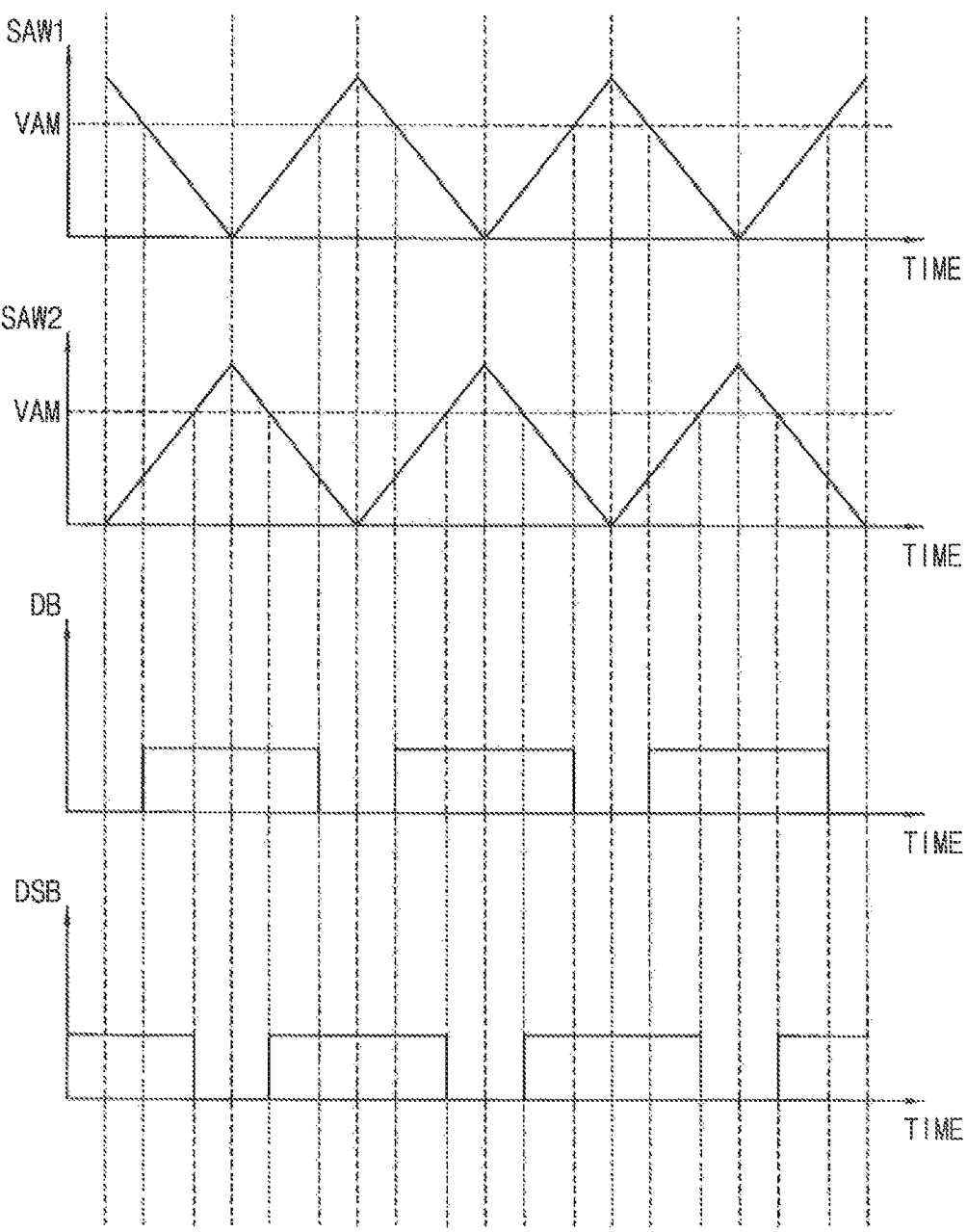
FIG. 11A is a timing diagram illustrating an operation of the switch control circuit of FIG. 10 in a first operation mode.
Figure 11B:
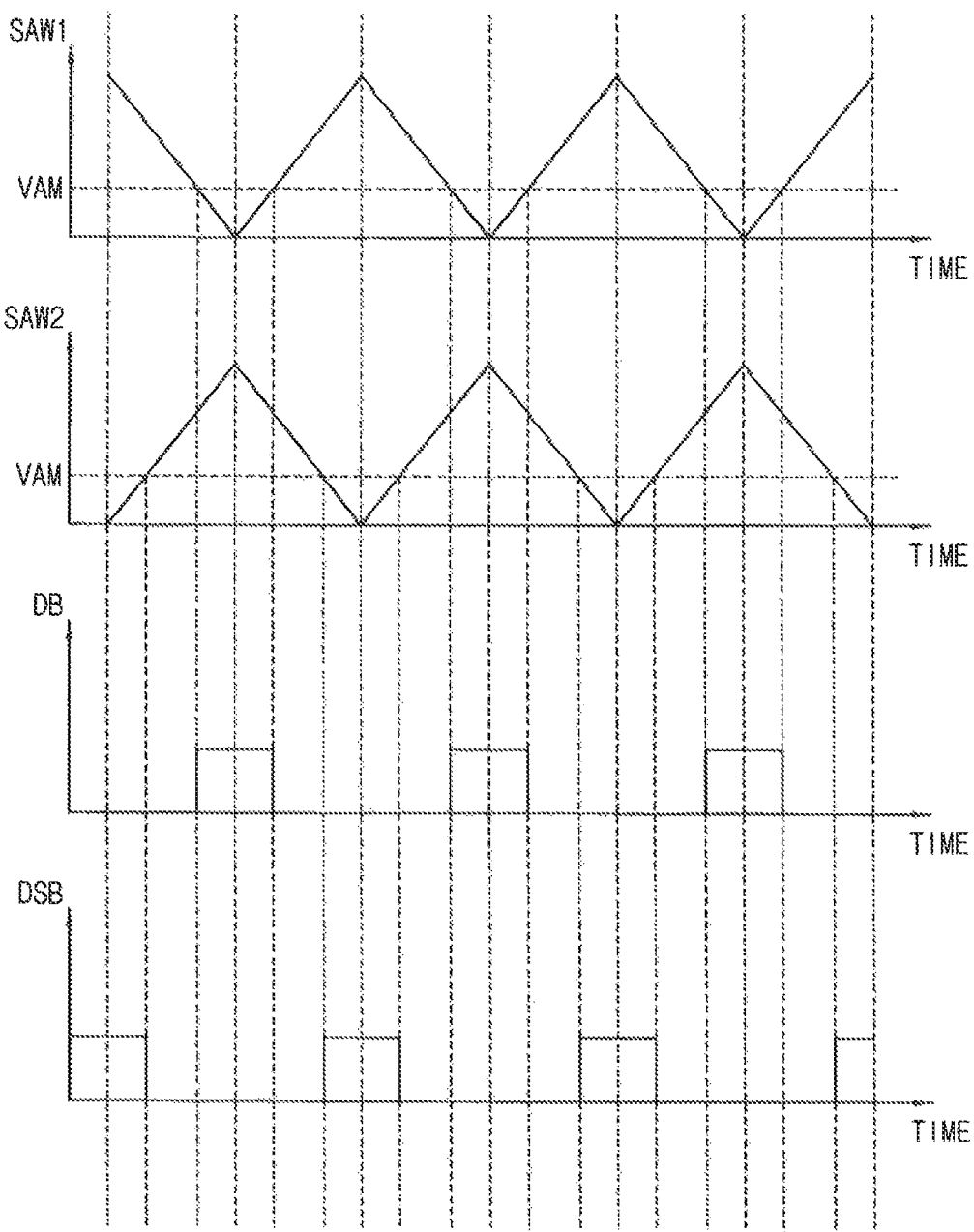
FIG. 11B is a timing diagram illustrating an operation of the switch control circuit of FIG. 10 in a second operation mode.

FIG. 10 is a diagram illustrating a switch control circuit included in a DC-DC converter according to exemplary embodiments of the present inventive concept, FIG. 11A is a timing diagram illustrating an operation of the switch control circuit of FIG. 10 in a first operation mode, and FIG. 11B is a timing diagram illustrating an operation of the switch control circuit of FIG. 10 in a second operation mode.

Referring to FIG. 10, a switch control circuit 301 may include an error amplifier EA, a compensation circuit CMP, a first ramp signal generator STG1, a second ramp signal generator STG2, a first comparator COM1, a second comparator COM2, a first inverter INV1 and a second inverter INV2. The compensation circuit CMP may include a resistor serially connected to a first capacitor and a second capacitor connected in parallel with the resistor and the first capacitor.

Referring to FIGS. 10, 11A and 11B, the error amplifier EA may amplify a difference between a voltage V0 of a negative input terminal (−) and a reference voltage VREF of a positive input terminal (+) to generate an amplification signal VAM. The compensation circuit CMP may be connected between the negative input terminal (−) and an output terminal of the error amplifier EA. In some exemplary embodiments of the present inventive concept, the voltage V0 of the negative input terminal (−) may be the output DC voltage VOUT of the DC-DC converter 10 of FIG. 1.

The first ramp signal generator STG1 may generate a first ramp signal SAW1 such as a sawtooth wave and the second ramp signal generator STG2 may generate a second ramp signal SAW2 having a phase difference of 180 degrees with respect to the first ramp signal SAW1.

The first comparator COM1 may compare the first ramp signal SAW1 and the amplification signal VAM to generate a signal that is activated when the voltage level of the first ramp signal SAW1 is higher than the voltage level of the amplification signal VAM. The first inverter INV1 may invert the output of the first comparator COM1 to generate the first switch control signal DB.

The second comparator COM2 may compare the second ramp signal SAW2 and the amplification signal VAM to generate a signal that is activated when the voltage level of the second ramp signal SAW2 is higher than the voltage level of the amplification signal VAM. The second inverter INV2 may invert the output of the second comparator COM2 to generate the second switch control signal DSB.

FIG. 11A illustrates that the duty ratio of the first switch control signal DB and the second switch control signal DSB is greater than 0.5 when the amplification signal VAM has the relatively high voltage level. In contrast, FIG. 11B illustrates that the duty ratio of the first switch control signal D13 and the second switch control signal DSB is smaller than 0.5 when the amplification signal VAM has the relatively low voltage level. The voltage level of the amplification signal VAM may be changed by adjusting the voltage level of the reference voltage VREF, and thus, the duty ratio of the first switch control signal DB and the second switch control signal DSB may be adjusted by adjusting the voltage level of the reference voltage VREF.

As described above, the first switch control signal D13 may be used as the first switch signal DB, the fourth switch signal DB4, the sixth switch signal DB2 and the seventh switch signal DB3, and the second switch control signal DSB may be used as the second switch signal DSB2, the third switch signal DSB3, the fifth switch signal DSB1 and the eighth switch signal DSB4.

Figure 12:
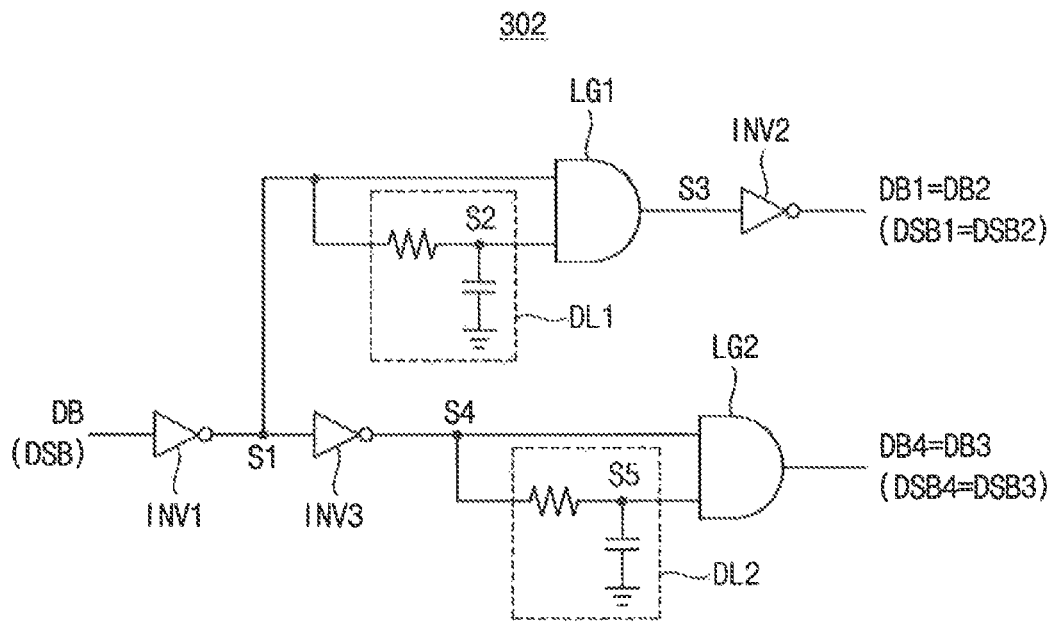
FIG. 12 is a diagram illustrating a switch control circuit included in a DC-DC converter according to exemplary embodiments of the present inventive concept.
Figure 13:
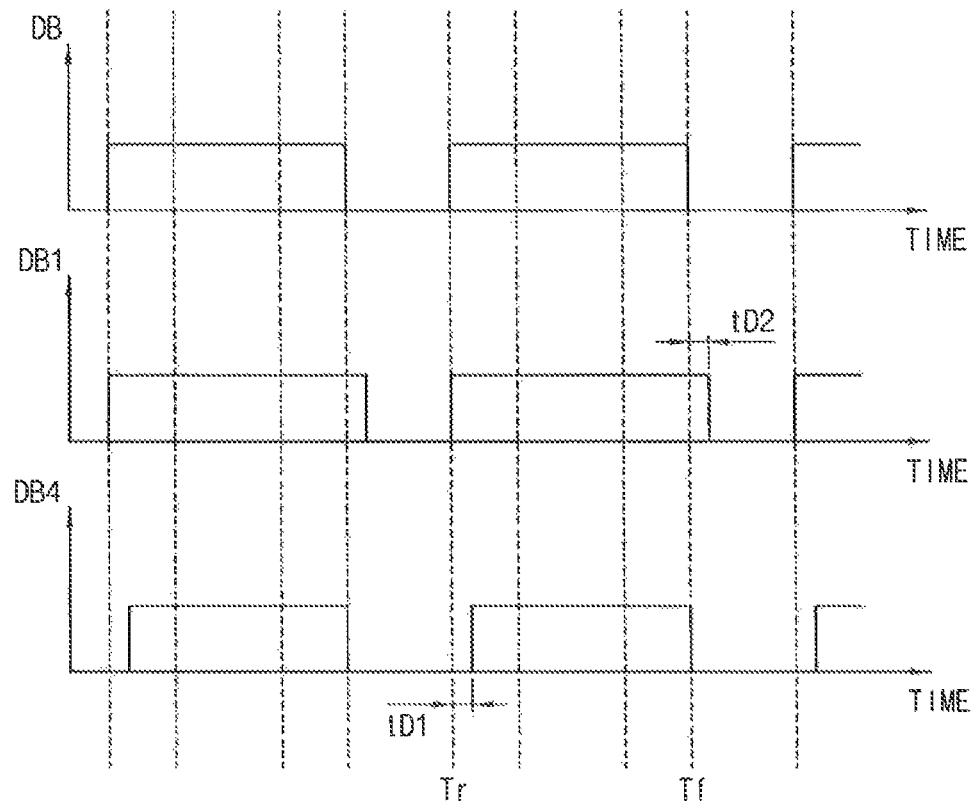
FIG. 13 is a timing diagram illustrating an operation of the switch control circuit of FIG. 12.

FIG. 12 is a diagram illustrating a switch control circuit included in a DC-DC converter according to exemplary embodiments of the present inventive concept, and FIG. 13 is a timing diagram illustrating an operation of the switch control circuit of FIG. 12.

Referring to FIG. 12, a switch control circuit 302 may include a first delay circuit DL1, a second delay circuit DL2, a first logic gate LG1, a second logic gate LG2, a first inverter INV1, a second inverter INV2 and a third inverter INV3. The switch control circuit 302 of FIG. 12 may provide delay times or dead-times of the switch signals for preventing shorted conduction paths between the input DC voltage and the ground voltage during the switching operations of the first switch circuit 110 and the second switch circuit 120. The switch control circuit 302 may further include the switch control circuit 301 of FIG. 10 to generate the first switch control signal DB and the second switch control signal DSB.

Referring to FIGS. 12 and 13, the first inverter INV1 inverts the first control signal DB to generate a first signal S1, and the first delay circuit DL1 delays the first signal S1 to generate a second signal S2. The first logic gate LG1 performs a logic operation (e.g., AND logic operation) on the first signal S1 and the second signal S2 to generate a third signal S3, and the second inverter INV2 inverts the third signal S3 to generate the first switch signal DB. The first delay circuit DL1 may include a resistor and a capacitor. One terminal of the capacitor may be connected to ground and another terminal of the capacitor may be connected to the resistor.

The third inverter INV3 inverts the first signal S1 to generate a fourth signal S4, and the second delay circuit DL2 delays the fourth signal S4 to generate a fifth signal S5. The second logic gate LG2 performs a logic operation (e.g., AND logic operation) on the fourth signal S4 and the fifth signal S to generate the fourth switch signal DB4. The second delay circuit DL2 may include a resistor and a capacitor. One terminal of the capacitor may be connected to ground and another terminal of the capacitor may be connected to the resistor.

As a result, as illustrated in FIG. 13, the fourth switch signal DB4 may be activated after a first delay time tD1 from when the first switch signal DB1 is activated, and the first switch signal DB1 may be deactivated after a second delay time tD2 from when the fourth switch signal DB4 is deactivated.

FIG. 13 illustrates, as an example, that the first switch signal DB1 and the fourth switch signal DB4 are generated based on the first switch signal DB. That the first switch signal DB1 and the sixth switch signal DB2 may be the same signal, and that the fourth switch signal DB4 and the seventh switch signal DB3 may be the same signal.

In the same way using the configuration of FIG. 12, the timings of the second switch signal DSB2, the third switch signal DSB3, the fifth switch signal DSB1 and the eighth switch signal DSB4 may be controlled based on the second switch control signal DSB. The second switch signal DSB2 and the fifth switch signal DSB1 may be the same signal, and the third switch signal DSB3 and the eighth switch signal DSB4 may be the same signal.

As a result, each of the third switch signal DSB3, the fourth switch signal DB4, the seventh switch signal DB3 and the eight switch signal DSB4 may be activated after the first delay time tD1 from when each of the first switch signal DB1, the second switch signal DSB2, the fifth switch signal DSB1 and the sixth switch signal D2 is activated, and each of the first switch signal DB1, the second switch signal DSB2, the fifth switch signal DSB1 and the sixth switch signal DB2 may be deactivated after the second delay time tD2 from when each of the third switch signal DSB3, the fourth switch signal DB4, the seventh switch signal DB3 and the eight switch signal DSB4 is deactivated.

By imposing such dead-times (e.g., delay times) tD1 and tD2 to the switch signals, in the power switching circuit may secure that the NMOS transistors are turned on after the PMOS transistors are turned off and the PMOS transistors are turned on after the NMOS transistors are turned off. Accordingly power consumption may be reduced and the breakdown of the transistors due to over-voltages or over-currents may be prevented.

Figure 14:
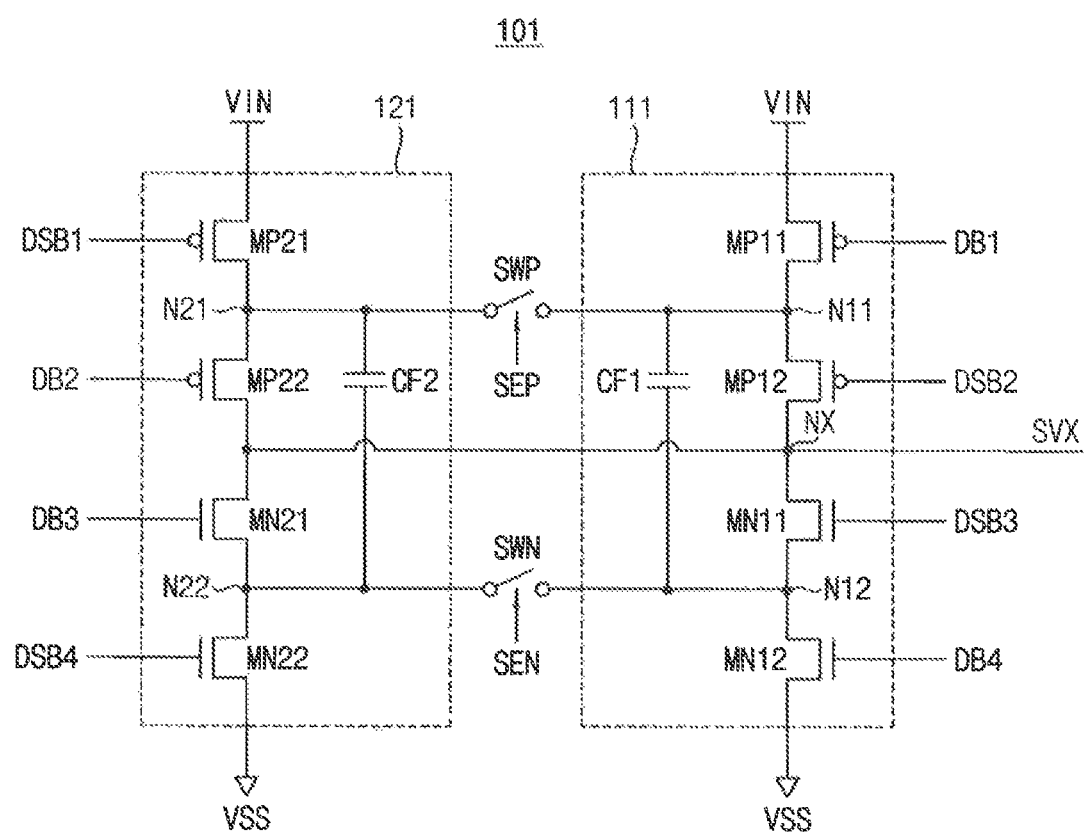
FIG. 14 is a circuit diagram illustrating a power switching circuit according to exemplary embodiments of the present inventive concept.

FIG. 14 is a circuit diagram illustrating a power switching circuit according to exemplary embodiments of the present inventive concept.

Referring to FIG. 14, a power switching circuit 101 may include a first switch circuit 111, a second switch circuit 121, a first equalization switch SWP and a second equalization switch SWN. Hereinafter the descriptions of elements similar to those in FIG. 3 may be omitted.

The first switch circuit 111 may include a first switch MP11, a second switch MP12, a third switch MN11, a fourth switch MN12 and a first flying capacitor CF. The first switch MP11 is connected between an input DC voltage VIN and a first node N1 and is configured to be turned on in response to a first switch signal DB1 applied to its gate. The second switch MP12 is connected between the first node N11 and the switching node NX and is configured to be turned on in response to a second switch signal DSB2 applied to its gate. The third switch MN11 is connected between the switching node NX and a second node N12 and is configured to be turned on in response to a third switch signal DSB3 applied to its gate. The fourth switch MN12 is connected between the second node N12 and a ground voltage VSS and is configured to be turned on in response to a fourth switch signal DB4 applied to its gate. The first flying capacitor CF1 is connected between the first node N11 and the second node N12.

The second switch circuit 121 includes a fifth switch MP21, a sixth switch MP22, a seventh switch MN21, an eighth switch MN22 and a second flying capacitor CF2. The fourth switch MP21 is connected between the input DC voltage VIN and a third node N21 and is configured to be turned on in response to a fourth switch signal DSB1 applied to its gate. The sixth switch MP22 is connected between the third node N21 and the switching node NX and is configured to be turned on in response to a sixth switch signal DB2 applied to its gate. The seventh switch MN21 is connected between the switching node NX and a fourth node N22 and is configured to be turned on in response to a seventh switch signal DB3 applied to its gate. The eighth switch MN22 is connected between the fourth node N22 and the ground voltage VSS and is configured to be turned on in response to an eighth switch signal DSB4 applied to its gate. The second flying capacitor CF2 is connected between the third node N21 and the fourth node N22.

The first through fourth switch signals DS1~DS4 and DSB1~DSB4 may be included in the plurality of switch control signals SSW shown in FIG. 1.

The first equalization switch SWP is connected between the first node N11 and the third node N21 and is configured to be turned on in response to a first equalization signal SEP. The second equalization switch SWN is connected between the second node N12 and the fourth node N22 and is configured to be turned on in response to a second equalization signal SEN.

In some exemplary embodiments of the present inventive concept, as illustrated in FIG. 14, the first switch MP11, the second switch MP12, the fifth switch MP21 and the sixth switch MP22 may be PMOS transistors, and the third switch MN11, the fourth switch MN12, the seventh switch MN21 and the eighth switch MN22 may be NMOS transistors.

The first switch circuit 111 and the second switch circuit 121 may have substantially the same operation characteristics. In other words, the first switch MP11 and the fifth switch MP21 may have the same size, the second switch MP12 and the sixth switch MP22 may have the same size, the third switch MN11 and the seventh switch MN21 may have the same size, the fourth switch MN12 and the eighth switch MN22 may have the same size, and the first flying capacitor CF1 and the second flying capacitor CF2 may have the same capacitance value. In this case, a capacitor voltage VCF between both electrodes of the first flying capacitor C1 may be substantially the same as that of the second flying capacitor CF2.

The first switch circuit 111 and the second switch circuit 121 may control the voltage level of a switching voltage signal SVX at the switching node NX through complementary switching operations using the first through eighth switching signals DB1~DB4 and DSB1~DSB4.

In addition, the first equalization switch SWP and the second equalization switch SWN may control the charged voltages of the first and second flying capacitors CF1 and CF2 to be uniform though a self-balancing operation using the first and second equalization signals SEP and SEN.

Figure 15:
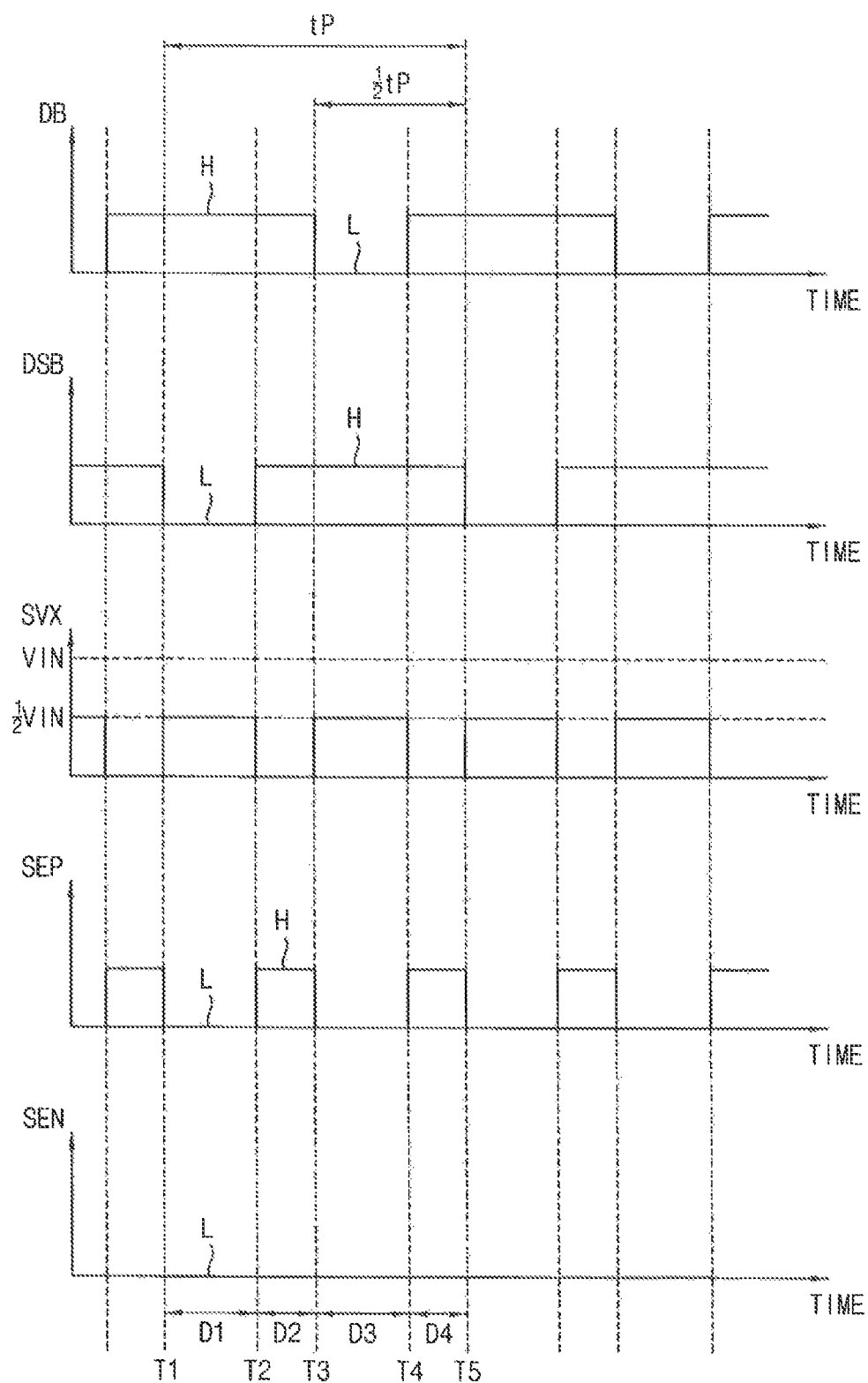
FIG. 15 is a timing diagram illustrating a first operation mode of the power switching circuit of FIG. 14.

FIG. 15 is a timing diagram illustrating a first operation mode of the power switching circuit of FIG. 14, and FIGS. 16A, 16B and 16C are diagrams illustrating switching operations in the first operation mode of the power switching circuit of FIG. 14. Hereinafter the descriptions of elements/timings similar to those in FIGS. 5, 6A, 6B and 6C may be omitted.

Figure 16A:
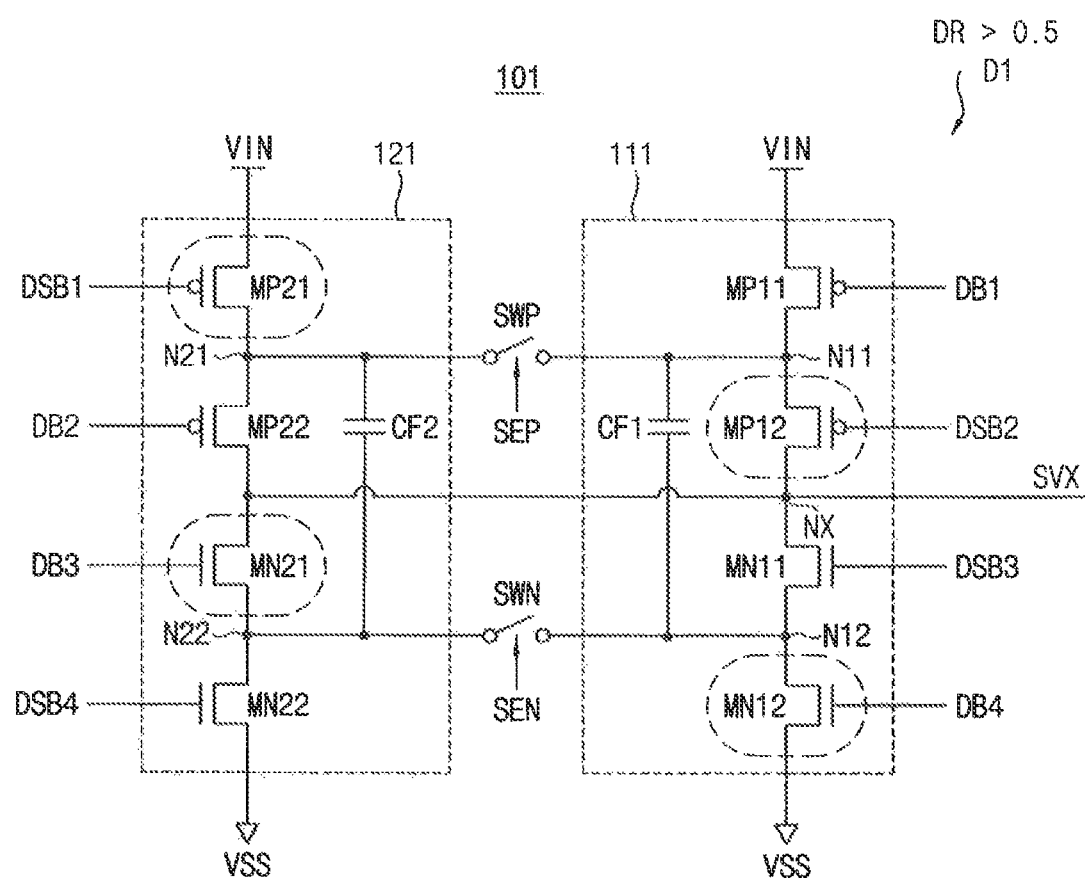
FIGS. 16A, 16B and 16C are diagrams illustrating switching operations in the first operation mode of the power switching circuit of FIG. 14.
Figure 16B:
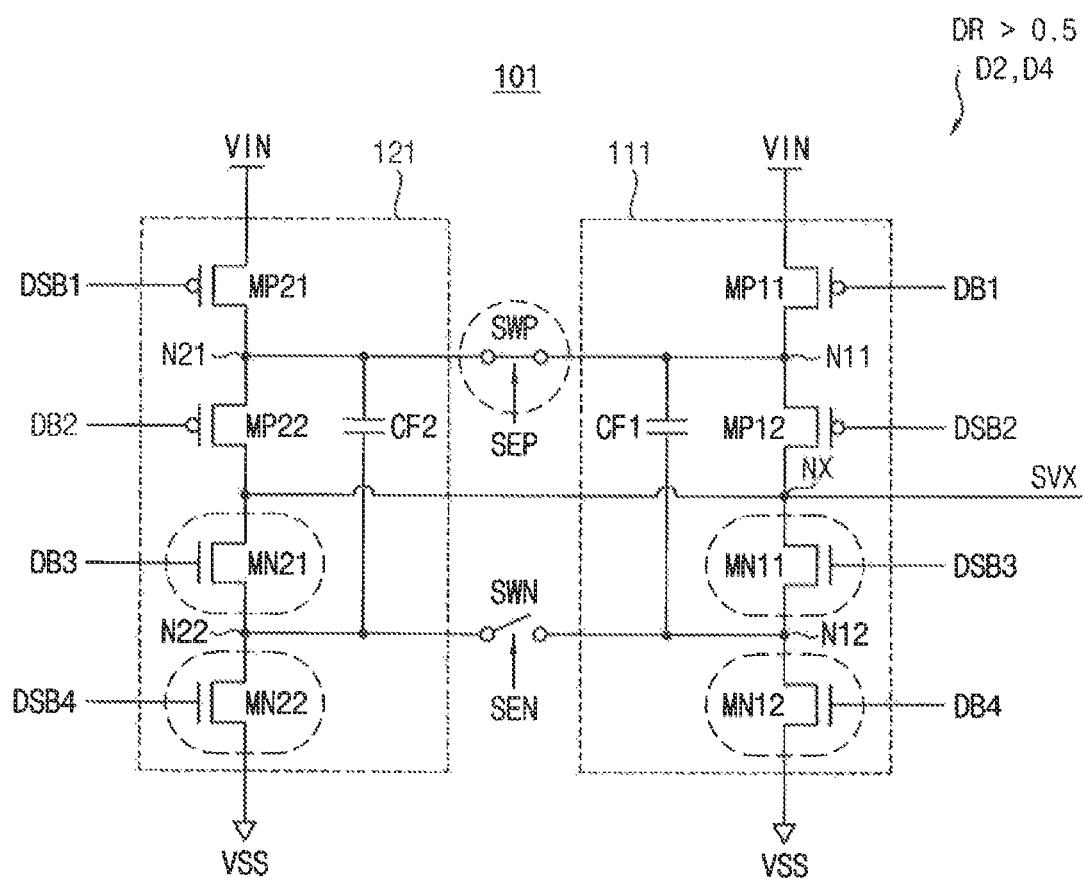
Figure 16C:
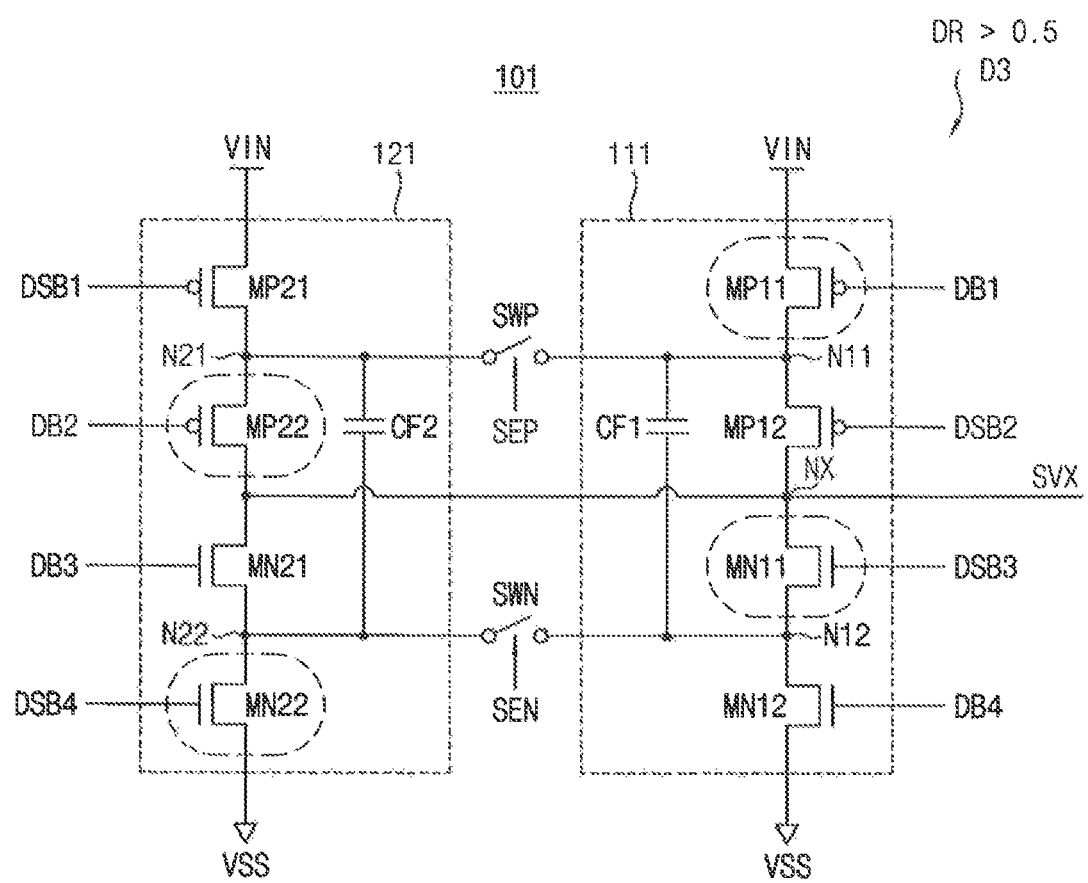

FIGS. 15, 16A, 16B and 16C illustrate a first operation mode when a duty ratio or a duty cycle of the first through eighth switch signals DB1~DB4 and DSB1~DSB4 is greater than 0.5. FIG. 16A illustrates the switching operation of the power switching circuit 101 in the first operation period D1, FIG. 16B illustrates the switching operation of the power switching circuit 101 in the second and fourth operation periods D2 and D4, and FIG. 16C illustrates the switching operation of the power switching circuit 101 in the third operation period D3. In FIGS. 16A, 16B and 16C, the switches that are turned on in each operation period are circled by dashes.

Referring to FIGS. 15, 16A, 16B and 16C, when the duty ratio of the first and second switch control signals DB and DSB corresponding to the first through eighth switch signals DB1~DB4 and DSB1~DSB4 is greater than 0.5, the first equalization switch SWP may be turned on periodically and the second equalization switch SWN may be turned off at all times.

Referring to FIGS. 15 and 16A, in the first operation period D1, the second switch MP12, the fourth switch MN12, the fifth switch MP21 and the seventh switch MN21 are turned on, and thus, the half voltage VIN/2 of the input DC voltage VIN may be applied to the switching node NX.

Referring to FIGS. 15 and 16B, in the second operation period D2 and the fourth operation period D4, the third switch MN1, the fourth switch MN12, the seventh switch MN21 and the eighth switch MN22 are turned on, and thus, the ground voltage VSS may be applied to the switching node NX. In addition, the first equalization switch SWP may be turned on to equalize the charged voltages of the first and second flying capacitors CF1 and CF2. In other words, the self-balancing operation may be performed to equalize the voltages of the first node N11 and the third node N21.

Referring to FIGS. 15 and 16C, in the third operation period D3, the first switch MP11, the third switch MN11, the sixth switch MP22 and the eighth switch MN22 are turned on, and thus, the half voltage VIN/2 of the input DC voltage VIN may be applied to the switching node NX.

Figure 17:
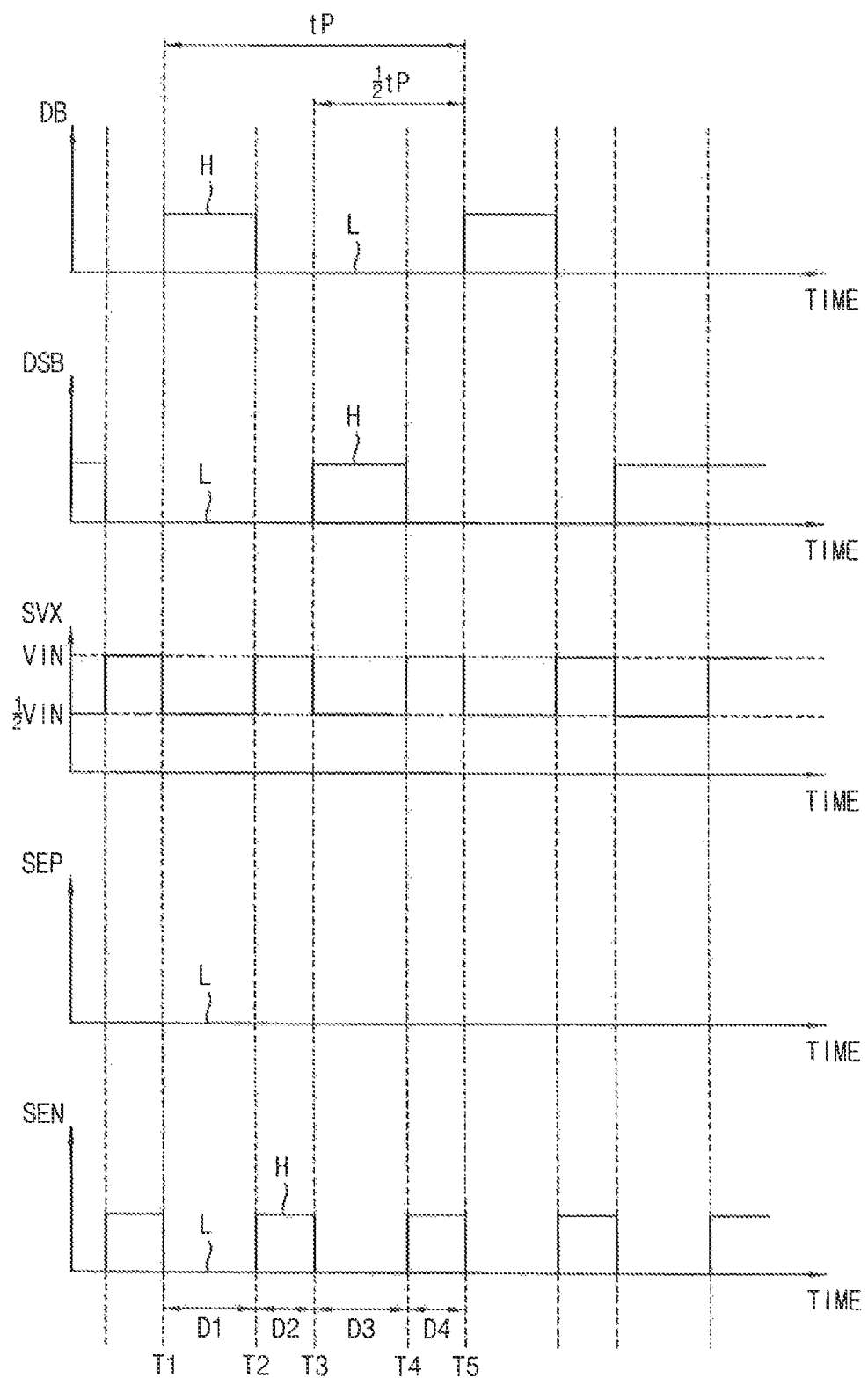
FIG. 17 is a timing diagram illustrating a second operation mode of the power switching circuit of FIG. 14.

FIG. 17 is a timing diagram illustrating a second operation mode of the power switching circuit of FIG. 14, and FIGS. 18A, 18B and 18C are diagrams illustrating switching operations in the second operation mode of the power switching circuit of FIG. 14. Hereinafter the descriptions of elements/timings similar to those in FIGS. 8, 9A, 9B and 9C may be omitted.

FIGS. 17, 18A, 18B and 18C illustrate a second operation mode when the duty ratio or the duty cycle of the first through eighth switch signals DB1~DB4 and DSB1~DSB4 is smaller than 0.5.

Referring to FIGS. 17, 18A, 18B and 18C, when the duty ratio of the first and second switch control signals DB and DSB corresponding to the first through eighth switch signals DB1~DB4 and DSB1~DSB4 is smaller than 0.5, the first equalization switch SWP may be turned off at all times and the second equalization switch SWN may be turned on periodically.

Figure 18A:
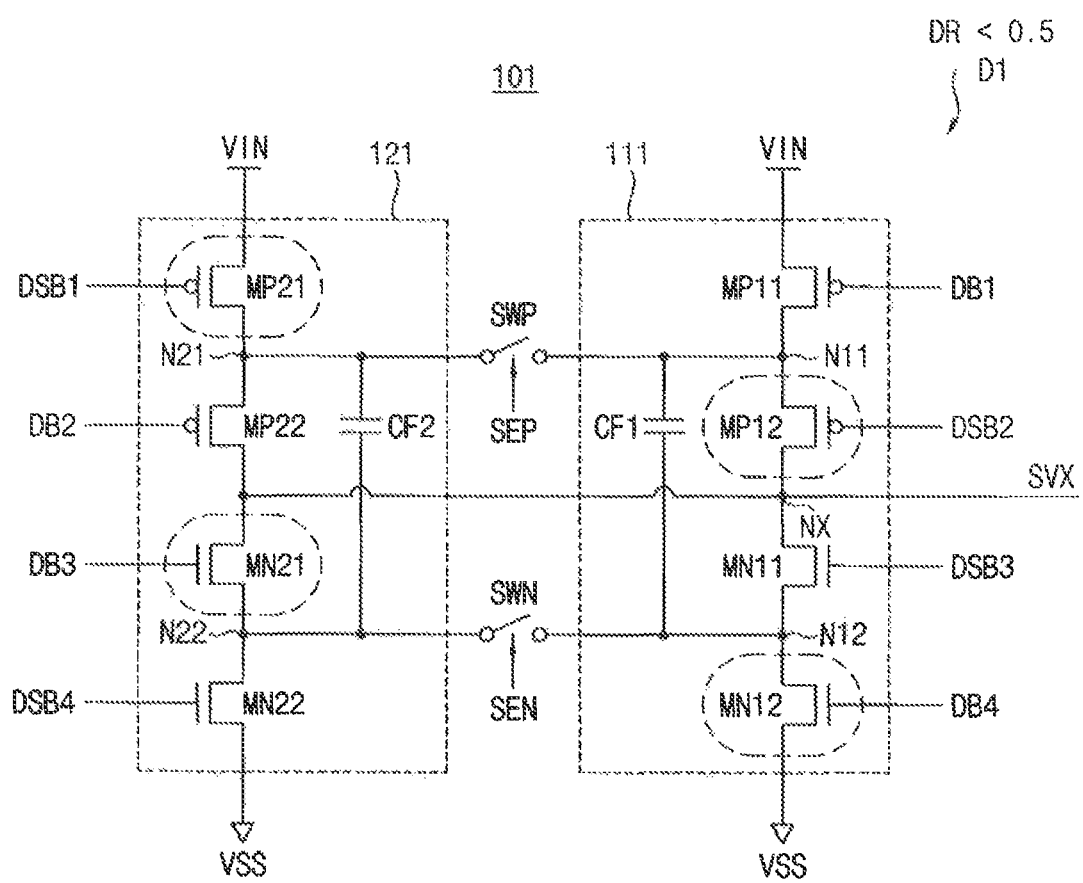
FIGS. 18A, 18B and 18C are diagrams illustrating switching operations in the second operation mode of the power switching circuit of FIG. 14.

Referring to FIGS. 17 and 18A, in the first operation period D1, the second switch MP12, the fourth switch MN12, the fifth switch MP21 and the seventh switch MN21 are turned on, and thus, the half voltage VIN/2 of the input DC voltage VIN may be applied to the switching node NX.

Figure 18B:
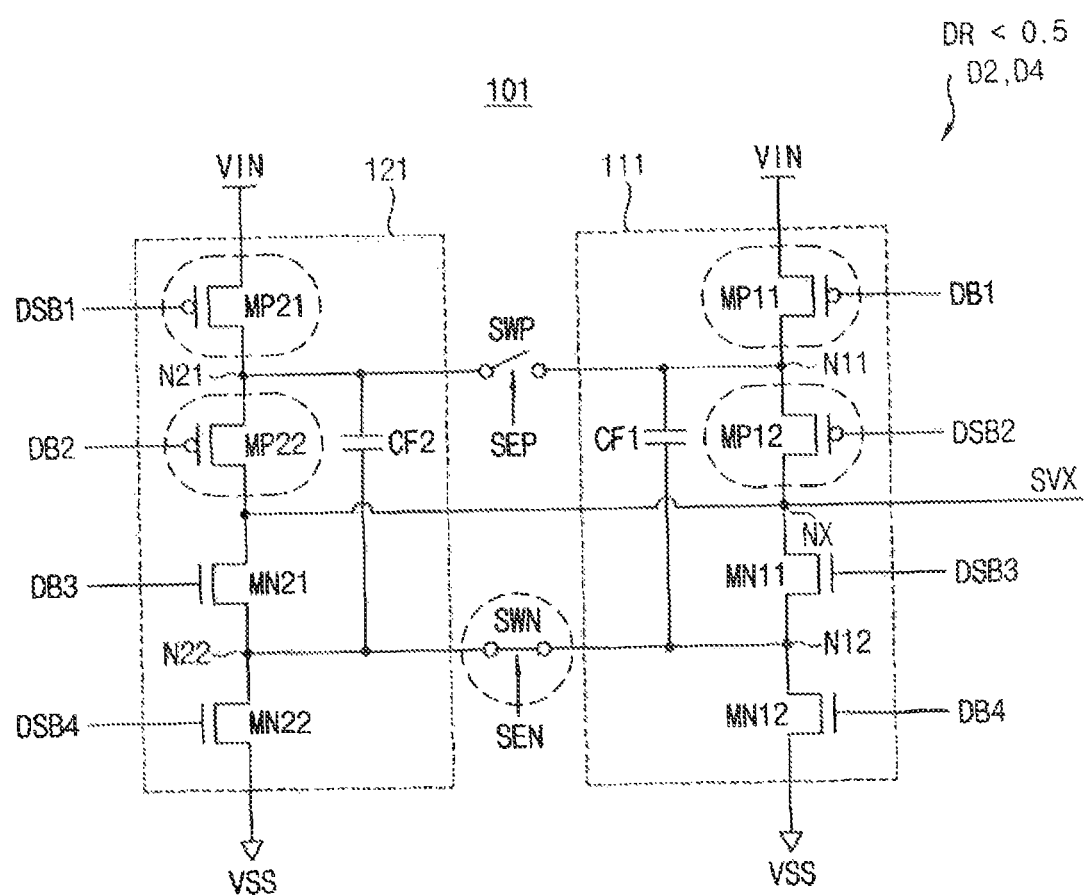

Referring to FIGS. 17 and 18B, in the second operation period D2 and the fourth operation period D4, the first switch MP11, the second switch MP12, the fifth switch MP21 and the sixth switch MP22 are turned on, and thus, the input DC voltage VIN may be applied to the switch node NX. In addition, the second equalization switch SWN may be turned on to equalize the charged voltages of the first and second flying capacitors CF1 and CF2. In other words, the self-balancing operation may be performed to equalize the voltages of the second node N12 and the fourth node N22.

Figure 18C:
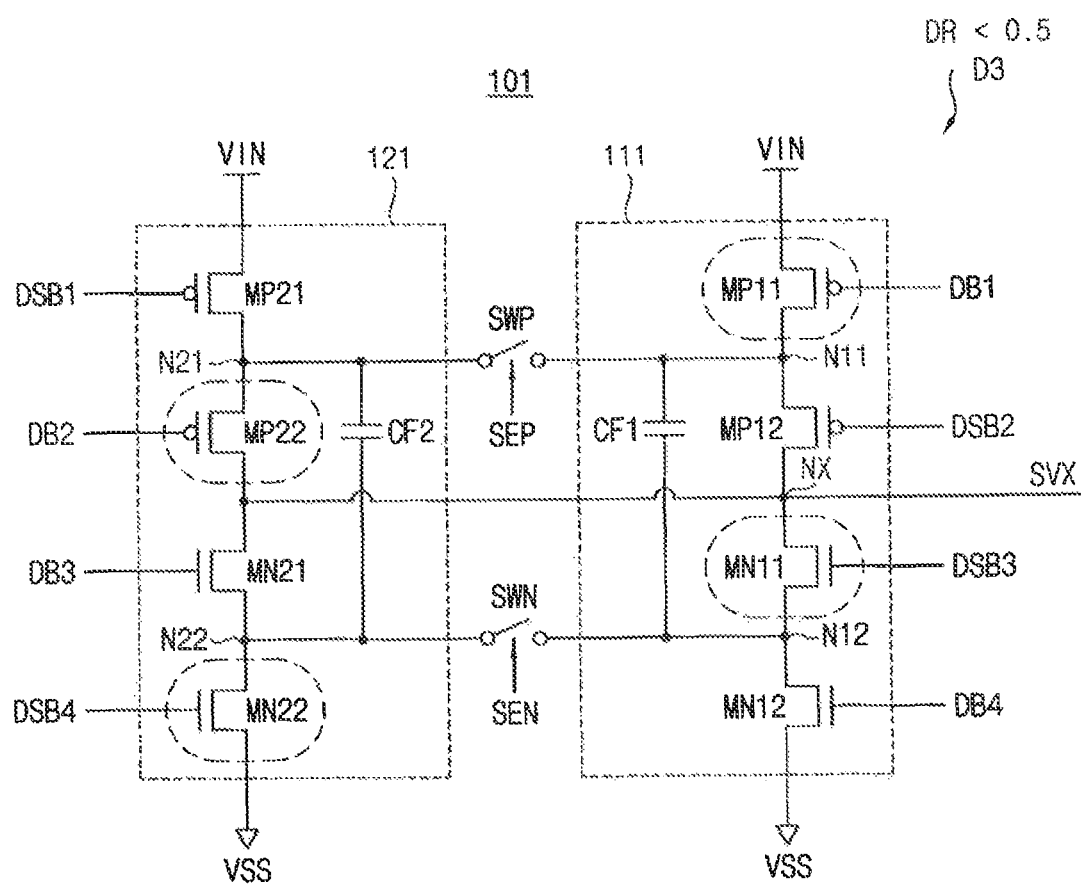

Referring to FIGS. 17 and 18C, in the third operation period D3, the first switch MP1l, the third switch MN11, the sixth switch MP22 and the eighth switch MN22 are turned on, and thus, the half voltage VIN/2 of the input DC voltage VIN may be applied to the switching node NX.

As such, opposing mismatch effects may be cancelled by performing the self-balancing operation such that the corresponding electrodes of the first and second flying capacitors CF1 and CF2 are connected through the first and second equalization switches SWP and SWN when the switch node NX is connected to the ground voltage VSS or the input DC voltage VIN. Accordingly, a simple and robust 3-level buck converter may be implemented without an additional feedback circuit.

Figure 19:
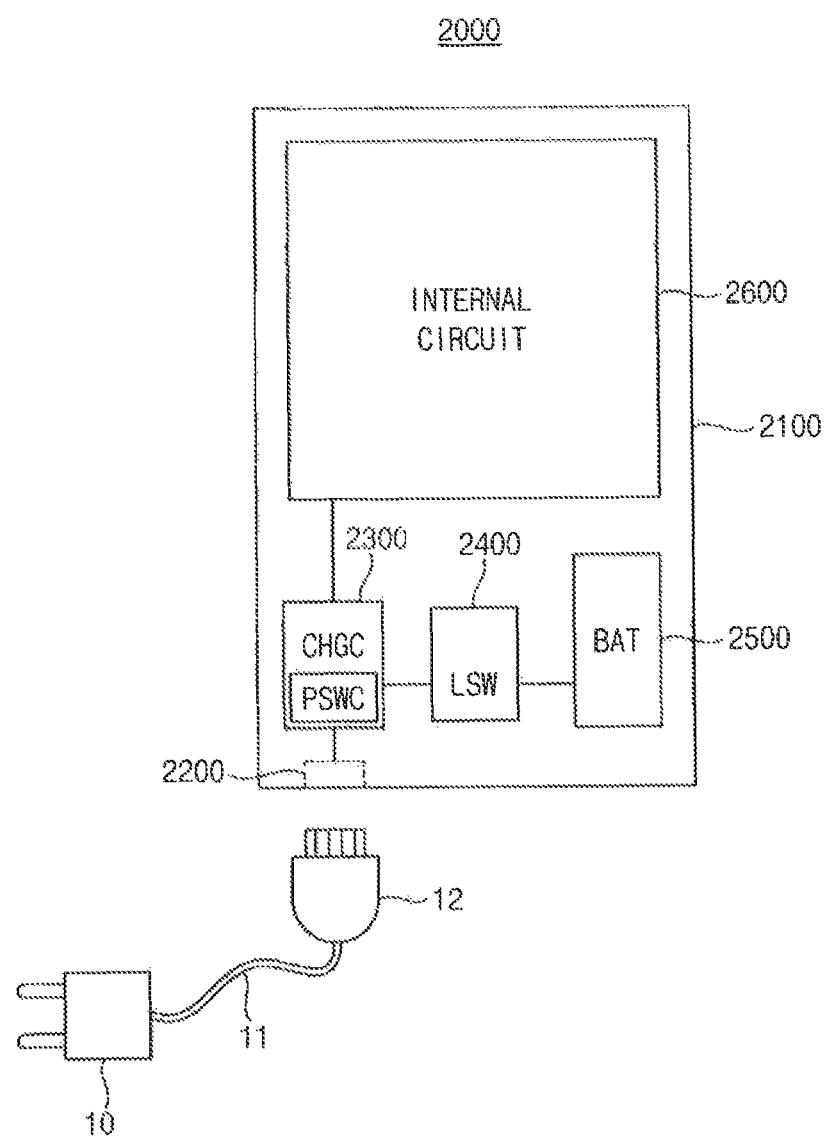
FIGS. 19 and 20 are diagrams illustrating a system including a power switching circuit according to exemplary embodiments of the present inventive concept.
Figure 20:
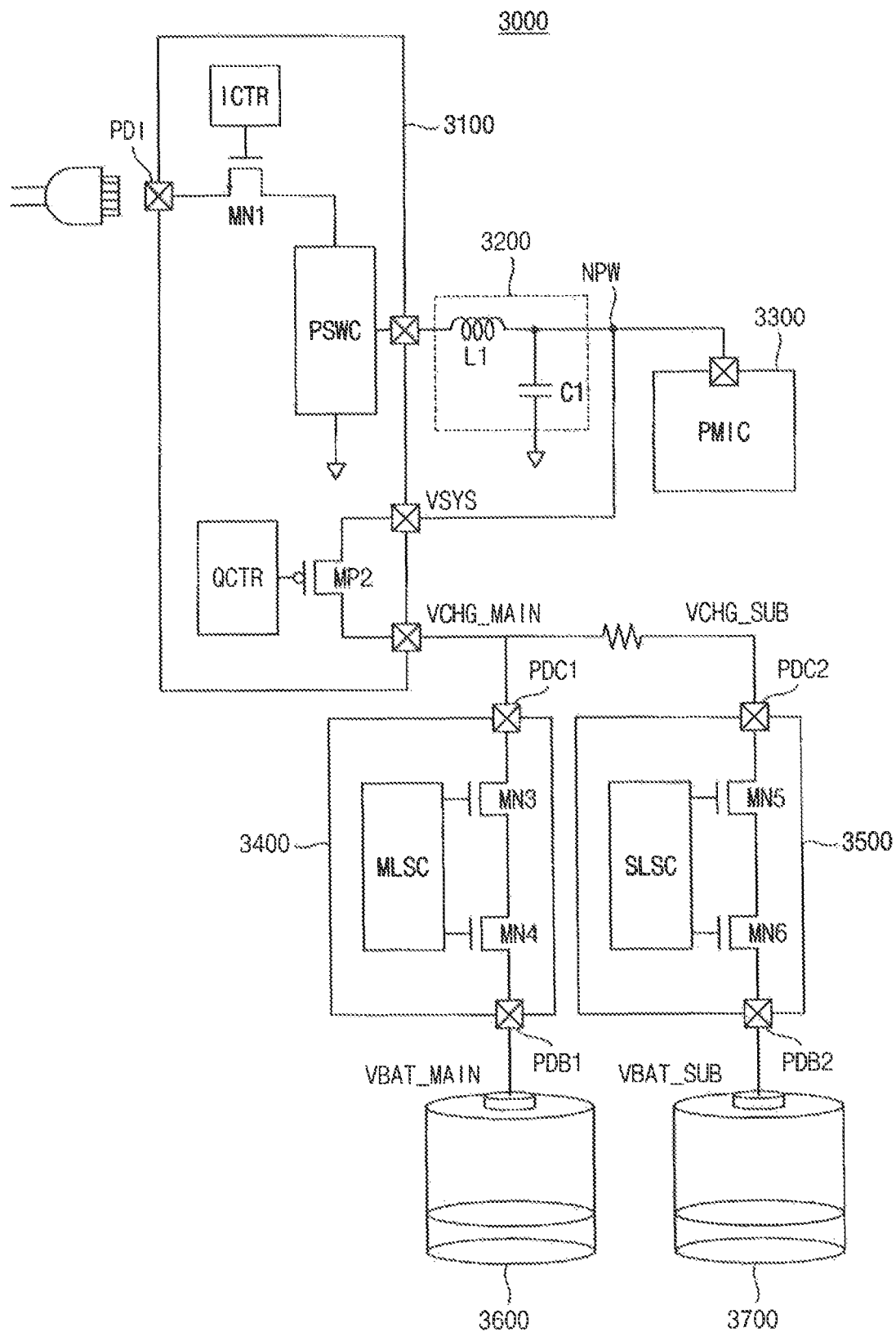

FIGS. 19 and 20 are diagrams illustrating a system including a power switching circuit according to exemplary embodiments of the present inventive concept.

Referring to FIG. 19, a system 2000 may include a mobile device 2100 such as a smartphone and an alternating current (AC)-DC wall adaptor or a travel adaptor 10 to supply power to the mobile device 2100. The travel adaptor 10 may be connected to a connector 2200 of the mobile device 2100 through a cable 11 and a jack 12 to supply power to the mobile device 2100.

The mobile device 2100 may include a charging control circuit CHGC 2300, a load switch circuit LSW 2400, a battery BAT 2500 and an internal circuit 2600.

The charging control circuit 2300 may change the DC voltage from the travel adaptor 10 to provide charging power to the battery 2500 and/or operating power to the internal circuit 2600. When the travel adaptor 10 is removed, the charged power in the battery may be provided to the internal circuit 2600.

The charging control circuit 2300 may include a power switching circuit PSWC according to exemplary embodiments of the present inventive concept described above to efficiently supply the charging power to the battery 2500. As described above, the power switching circuit PSWC may perform the complementary switching operation and/or the self-balancing operation to compensate the mismatch effects without using an additional feedback circuit.

Referring to FIG. 20, an electronic device or an electronic system 3000 may include a charging control circuit 3100 and 3200, a power management integrated circuit PMIC 3300, a main load switch circuit 3400, a sub load switch circuit 3500, a main battery 3600 and a sub battery 3700.

The charging control circuit 3100 and 3200 may include a voltage converter 3100 and a low pass filter 3200. The voltage converter 3100 may include a power switching circuit PSWC, transistors MN1 and MP2 and controllers ICTR and QCTR to control the transistors MN1 and MP2. The low pass filter 3200 may be implemented with an inductor L and a capacitor C1, and so on. The power switching circuit PSWC may perform the complementary switching operation and/or the self-balancing operation according to exemplary embodiments of the present inventive concept to compensate the mismatch effects without an additional feedback circuit.

The voltage converter 3100 may receive power from the travel adaptor through the input pad PDI and provide operating power through a power node NPW to internal circuits such as the power management integrated circuit 3300. In addition, the voltage converter 3100 may provide charging power to the main battery 3600 and the sub battery 3700. The power node NPW may be connected to the controller QCTR via a terminal through which a system voltage VSYS is applied.

The main load switch circuit 3400 may be connected to the voltage converter 3100 through a first charging pad PDC1 to which a main charging voltage VCHG_MAIN is applied and connected to the main battery 3600 through a first battery pad PDB1 to which a main battery voltage VBAT_MAIN is applied. The sub load switch circuit 3500 may be connected to the voltage converter 3100 through a second charging pad PDC2 to which a sub charging voltage VCHG_SUB is applied and connected to the sub battery 3700 through a second battery pad PDB2 to which a sub battery voltage VBAT_SUB is applied. The main charging voltage VCHG_MAIN and the sub charging voltage VCHG_SUB may be different due to the parasitic resistance along the intermediate path.

The main load switch circuit 3400 may include a main charging transistor MN4, a main discharging transistor MN3 and a main load switch controller MLSC. The sub load switch circuit 3500 may include a sub charging transistor MN6, a sub discharging transistor MN5 and a sub load switch controller SLSC. Each of the main load switch controller MLSC and the sub load switch controller SLSC may be configured to selectively operate in the voltage control mode or current control mode based on the magnitude of the charging current and/or the discharging current as described above.

As described above, the power switching circuit, the DC-DC converter including the power switching circuit and the voltage conversion method according to exemplary embodiments of the present inventive concept may enhance voltage conversion efficiency without feedback circuits by compensating for effects from a mismatch of the power switching circuit and a mismatch of the switch control signals through the complementary switching operations of the switch circuits.

In addition, the voltage conversion efficiency may be further enhanced through the self-balancing operation of the flying capacitor as well as the complementary switching operations of the switch circuits.

The present inventive concept may be applied to any electronic devices and systems requiring voltage conversion. For example, the present inventive concept may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

While the present inventive concept has been shown and described with reference to exemplary embodiments thereof, it will be apparent to those of ordinary skill in the art that various modifications in form and details may be made thereto without departing from the spirit and scope of the present inventive concept as set forth by the following claims.

What is claimed is:

1. A direct current (DC)-DC converter, comprising:
a power switching circuit including a first switch circuit and a second switch circuit that are connected in parallel to a switching node, the first switch circuit and the second switch circuit configured to generate a switching voltage signal through the switching node in response to an input DC voltage and configured to perform complementary switching operations to control a voltage level of the switching voltage signal; and
a filter circuit configured to filter the switching voltage signal to generate an output DC voltage,
wherein the first switch circuit includes a first flying capacitor, and the second switch circuit includes a second living, capacitor,
wherein a first equalization switch is connected between a first electrode of the first flying capacitor and a first electrode of the second flying capacitor, and wherein a second equalization switch is connected between a second electrode of the first flying capacitor and a second electrode of the second living capacitor.

2. The DC-DC converter of claim 1, wherein, when the first Switch circuit applies a first intermediate voltage to the switching node, the second switch Circuit applies a second intermediate voltage to the switching node at the same time, and wherein, whet the first switch circuit applies the second intermediate voltage to the switching node, the second switch circuit applies the first intermediate voltage to the switching node at the same time.

3. The DC-DC convener of claim 2, wherein an average of the first intermediate voltage and the second intermediate voltage corresponds to a half of the input DC voltage.

4. The DC-DC converter of claim 2, wherein the first intermediate voltage corresponds to a capacitor voltage between the first and second electrodes of each of the first flying capacitor and the second flying capacitor, and the second intermediate voltage corresponds to a difference between the input DC voltage and the capacitor voltage.

5. The DC-DC convener of claim 1, wherein, during a first operation period, the first switch circuit applies a first intermediate voltage corresponding to a capacitor voltage to the switching node and the second switch circuit applies a second intermediate voltage corresponding to a difference between the input DC voltage and the capacitor voltage to the switching node, wherein, during a second operation period after the first operation period, the first switch circuit and the second switch circuit apply the input DC voltage or a ground voltage to the switching node, wherein, during a third operation period after the second operation period, the first switch circuit applies the second intermediate voltage to the switching node and the second switch circuit applies the first intermediate voltage to the switching node, and wherein, during a fourth operation period after the third operation period, the first switch circuit and the second switch circuit apply the input DC voltage or the ground voltage to the switching node.

6. The DC-DC converter of claim 1, wherein the first switch circuit includes;

a first switch connected between the input DC voltage and a first node and configured to be turned on in response to a first switch signal;

a second switch connected between the first node and the switching node and configured to be turned on in response to a second switch signal;

a third switch connected between the switching node and a second node and configured to be turned on in response to a third switch signal;

a fourth switch connected between the second node and a ground voltage and configured to be turned on in response to a fourth switch signal; and the first flying capacitor connected between the first node and the second node, and wherein the second switch circuit includes:

a fifth switch connected between the input DC voltage and a third node and configured to be turned on in response to a fifth switch signal;

a sixth switch connected between the third node and the switching node grid configured to be turned on in response to a sixth switch signal;

a seventh switch connected between the switching node and a fourth node and configured to be turned on ire response to a seventh switch signal;

an eighth switch connected between the fourth node and the ground voltage and configured to be turned on in response to an eighth switch signal; and the second flying capacitor co connected between the third node and the fourth node.

7. The DC-DC convener of claim 6, whet in, when the second itch, the fourth switch, the fifth switch and the seventh switch are turned on, the first switch, the third switch, the sixth switch and the eighth switch are turned off, and wherein where the first switch, the third switch, the sixth switch and the eighth switch are turned on, the second switch, the fourth switch, the fifth switch and the seventh switch are turned off.

8. The DC-DC converter Of claim 7, wherein when the third switch, the fourth switch, the seventh switch and the eighth switch are turned on, the first switch, the second switch, the fifth snitch and the sixth switch are turned off, and wherein, when the first switch, the second switch, the fifth switch and the sixth switch are turned on, the third switch, the fourth switch, the seventh switch and the eighth switch are turned off.

9. The DC-DC converter of claim 6, wherein, during a first stint operation period, the second switch, the fourth switch, the fifth switch and the seventh switch are turned on, wherein, during a second operation period, after the first operation period, the third switch, the fourth switch, the seventh switch and the eighth switch are turned on, or the first switch, the second switch, the fifth switch and the sixth switch are turned on, wherein, during a third operation period after the second operation period, the first switch, the third switch, the sixth switch and the eighth switch are turned on, and wherein, during a fourth operation period after the third operation period, the third switch, the fourth switch, the seventh switch and the eighth switch are turned on, or the first switch, the second switch, the fifth switch and the sixth switch, are turned on.

10. The DC-DC converter of claim 9, wherein, when a duty ratio of the first, second, third, fourth, fifth, sixth, seventh and eighth switch signals is greater than 0.5, the third switch, the fourth switch, the seventh switch and the eighth switch are turned on during the second operation period and the fourth operation period, and wherein, when the duty ratio of the first, second, third, fourth, fifth, sixth, seventh and eight switch signals is smaller than 0.5, the first switch, the second switch, the fifth switch and the sixth switch are turned on during the second operation period and the fourth operation period.

11. The DC-DC converter of claim 6, wherein the first switch, the second switch, the fifth switch and the sixth switch are P-channel metal oxide semiconductor (PMOS) transistors, and wherein the third switch, the fourth switch, the seventh switch and the eighth switch are N-channel metal oxide semiconductor (NMOS) transistors.

12. The DC-DC converter of claim 6, wherein the first switch signal, the fourth switch signal, sixth switch signal and the seventh switch signal are activated simultaneously, and wherein the second switch signal, the third switch signal, fifth switch signal and the eighth switch signal are activated simultaneously.

13. The DC-DC converter of claim 6, wherein each of the third switch signal, the fourth switch signal, the seventh switch signal and the eighth switch signal is activated after a first delay time from when each of the first switch signal, the second switch signal, the fifth switch signal and the sixth switch signal is activated, and wherein each of the first switch signal, the second switch signal, the fifth switch signal and the sixth switch signal is deactivated after a second delay time from when each of the third switch signal, the fourth switch signal, the seventh switch signal and the eighth switch signal is deactivated.

14. The DC-DC converter of claim 1, wherein
the first equalization switch is configured to be turned on in response to a first equalization signal, and
the second equalization switch is configured to be turned on in response to a second equalization signal.

15. The DC-DC convener of claim 14, wherein, when a duty ratio of the first, second, third, fourth, fifth, sixth, seventh and eighth switch signals is greater than 0.5, the first equalization switch is turned on periodically and the second equalization switch is kept off, and wherein, when the duty ratio of the first, second, third, fourth, fifth, sixth, seventh and eighth switch signals is smaller than 0.5, the first equalization switch is kept off and the second equalization switch is turned on periodically.

16. The DC-DC convener of claim 14, wherein a duty ratio of the first, second, third, fourth, fifth, sixth, seventh and eighth switch signals is greater than 0.5, wherein, during a first operation period, the second switch, the fourth switch, the fifth switch and the seventh switch are turned on, wherein, during a second operation period after the first operation period, the third switch, the fourth switch, the seventh switch, the eighth switch and the first equalization switch are turned on, wherein, during a third operation period after the second operation period, the first switch, the third switch, the sixth switch and the eighth switch are turned on, and wherein, during a fourth operation period after the third operation period, the third switch, the fourth switch, the seventh switch, the eighth switch and the first equalization switch are turned on.

17. The DC-DC converter of claim 14, wherein, when a duty ratio of the first, second, third, fourth, fifth, sixth, seventh and eighth switch signals is smaller than 0.5, wherein, during a first operation period, the second switch, the fourth switch, the fifth switch and the seventh switch are turned on, wherein, during a second operation period, after the first operation period, the first switch, the second switch, the fifth switch, the sixth switch and the second equalization switch are turned on, wherein, during a third operation period after the second operation period, the first switch, the third switch, the sixth switch and the eighth switch are turned on, and wherein, during a fourth operation period after the third operation period, the first switch, the second switch, the fifth switch, the sixth switch and the second equalization switch are turned on.

18. A power switching circuit, comprising:
a first switch circuit and a second switch circuit that are connected in parallel to a switching node, the first switch circuit and the second switch circuit configured to generate a switching voltage signal through the switching; node in response to a direct current (DC) voltage, the first switch circuit comprising:
a first switch connected between a DC voltage node through which the DC voltage is provided and a first node and configured to be turned on in response to a first switch signal;
a second switch connected between the first node and the switching node and configured to be turned on in response to a second switch signal;
a third switch connected between the switching node and a second node and configured to be turned on in response to a third switch signal;
a fourth switch connected between the second node and a ground voltage node through which a ground voltage is provided and configured to be turned on ire response to a fourth switch signal; and
a first flying capacitor connected between the first node and the second node, and wherein the second switch circuit includes:
a fifth switch connected between the DC voltage node and a third node and configured to be turned on in response to a fifth switch signal;
a sixth switch connected between the third node and the switching node and configured to be turned on in response to a sixth switch signal;
a seventh switch connected between the switching node and a fourth node and configured to be turned on in response to a seventh switch signal;
an eighth switch connected between the fourth node and the ground voltage node and configured to be turned on in response to an eighth switch signal; and
a second flying capacitor connected between the third node and the fourth node, wherein the power switching circuit further comprises:
a first equalization switch connected between the first node and the third node and configured to be turned on in response to a first equalization signal, and
a second equalization switch connected between the second node and the fourth node and configured to be turned on in response to a second equalization signal.

19. A voltage conversion method, comprising:
providing a first switch circuit and a second switch circuit that are connected in parallel to a switching node, wherein the first switch circuit and the second switch circuit are configured to generate a switching voltage signal through the switching node based on an input direct current (DC) voltage;
controlling the first switch circuit and the second switch circuit such that, when the first switch circuit applies a first intermediate voltage to the switching node, the second switch circuit applies a second intermediate voltage to the switching node at the same time; and
controlling the first switch circuit and the second switch circuit such that, when the first switch circuit applies the second intermediate voltage to the switching node, the second switch circuit applies the first intermediate voltage to the switching node at the same time,
wherein the first intermediate voltage is less than half of the input DC voltage and the second intermediate voltage is greater than half of the input DC voltage.

* * * * *